United States Patent
Su et al.

(10) Patent No.: US 12,052,057 B2
(45) Date of Patent: Jul. 30, 2024

(54) SERVICE SIGNAL PROCESSING METHOD AND DEVICE

(71) Applicant: Huawei Technologies Co., Ltd., Shenzhen (CN)

(72) Inventors: Wei Su, Dongguan (CN); Junling Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/720,485

(22) Filed: Apr. 14, 2022

(65) Prior Publication Data

US 2022/0239374 A1 Jul. 28, 2022

Related U.S. Application Data

(63) Continuation of application No. PCT/CN2020/116450, filed on Sep. 21, 2020.

(30) Foreign Application Priority Data

Oct. 15, 2019 (CN) .......................... 201910980184.5

(51) Int. Cl.
*H04B 10/272* (2013.01)
(52) U.S. Cl.
CPC ................... *H04B 10/272* (2013.01)
(58) Field of Classification Search
CPC ................ H04Q 11/0067; H04B 10/272
See application file for complete search history.

(56) References Cited

U.S. PATENT DOCUMENTS

2010/0080558 A1* 4/2010 Kazawa ................ H04J 3/0682
398/66
2013/0287396 A1* 10/2013 Cavaliere ............ H04J 14/0238
398/48
(Continued)

FOREIGN PATENT DOCUMENTS

| CN | 101729371 A | 6/2010 |
|---|---|---|
| CN | 107196876 A | 9/2017 |
| CN | 108092709 A | 5/2018 |

(Continued)

OTHER PUBLICATIONS

ITU-T G.984.1, "Gigabit-capable passive optical networks (GPON): General characteristics", ITU, Mar. 2003 (Year: 2003).*
(Continued)

*Primary Examiner* — Shi K Li
(74) *Attorney, Agent, or Firm* — Conley Rose, P.C.

(57) ABSTRACT

In a service signal processing method, an optical network unit (ONU) receives a service signal; maps the service signal to a flexible optical service unit frame; and sends a first passive optical network transmission convergence frame to an optical line terminal (OLT), where the flexible optical service unit frame is encapsulated in the first passive optical network transmission convergence frame, and where the flexible optical service unit frame is used to carry the service signal in a passive optical network (PON) and an optical transport network (OTN). In this application, the flexible optical service unit frame can be transmitted in both the PON and the OTN, and the ONU and the OLT do not need to parse the service signal.

27 Claims, 16 Drawing Sheets

(56) References Cited

U.S. PATENT DOCUMENTS

2018/0041280 A1\* 2/2018 Elahmadi ........... H04B 10/2569
2019/0007133 A1 1/2019 Soto et al.

FOREIGN PATENT DOCUMENTS

| CN | 109040863 | A | 12/2018 |
| CN | 109936781 | A | 6/2019 |
| EP | 2348691 | A1 | 7/2011 |
| EP | 3716641 | A1 | 9/2020 |

OTHER PUBLICATIONS

ITU-T G.984.3, "Gigabit-capable passive optical networks (G-PON): Transmission convergence layer specification", ITU, Jan. 2014 (Year: 2014).\*

"Draft Recommendation ITU-T G.987.3 (ex G.xgpon.3) (new) Rev.2 (AR) 10-Gigabit-capable passive optical networks (XG-PON): Transmission convergence (TC) specifications," vol. 802.1, Oct. 18, 2010, 151 pages, XP017737870.

Wei Su et al "Sub1 G OTN enhancement consideration," SG15-C.1311, Study Group 15, Jul. 1-12, 2019, 4 pages, XP044270089.

Yaqin Wang et al, "Considerations on sub-1 G switching and smooth transport network transition," SG15-C1450, Study Group 15, Geneva, Jul. 1-12, 2019, 7 pages, XP044270276.

Yaqin Wang et al "Considerations on Sub-1 G services and flexible mapping over OTN," SG15-C1451, Study Group 15, Geneva, Jul. 1-12, 2019, 4 pages, XP044270277.

\* cited by examiner

SERVICE SIGNAL PROCESSING METHOD AND DEVICE

CROSS-REFERENCE TO RELATED APPLICATIONS

This application is a continuation of International Patent Application No. PCT/CN2020/116450, filed on Sep. 21, 2020, which claims priority to Chinese Patent Application No. 201910980184.5, filed on Oct. 15, 2019. The disclosures of the aforementioned applications are hereby incorporated by reference in their entireties.

TECHNICAL FIELD

This application relates to the field of passive optical network technologies, and in particular, to a service signal processing method and a device.

BACKGROUND

A passive optical network (PON) is an optical access technology that uses a point-to-multipoint topology structure. FIG. 1 is a schematic diagram of a structure of a PON system. As shown in FIG. 1, a PON system 100 includes an optical line terminal (OLT) 104, an optical distribution network (ODN) 102, and an optical network unit (ONU) or an optical network terminal (ONT) 101. The ODN is a passive optical splitting component, and the ODN is divided into three parts: a passive optical splitter 103, a feeder optical fiber 106, and a distribution optical fiber 107. In the PON system, the ODN 102 divides one optical fiber into a plurality of optical fibers, and ONUs share a bandwidth. Transmission in a direction from the OLT 104 to the ONU 101 is referred to as downstream, and transmission in a direction from the ONU 101 to the OLT 104 is referred to as upstream. For an upstream service, access is implemented in a time division multiple access manner, and each ONU 101 can send upstream data of the ONU 101 only in a slot allocated by the OLT 104. For a downstream service, information data is sent to ONUs 101 in a time division multiplexing broadcast manner. The ODN 102 transmits downstream data of the OLT 104 to the ONUs 101, and also transmits upstream data of a plurality of ONUs 101 to the OLT 104 through convergence. A structure of the ONU 101 is similar to a structure of the ONT. In the solutions provided in this application document, the optical network unit and the optical network terminal may be interchanged.

As a core technology of a next-generation transport network, an OTN includes electric-layer and optical-layer technical specifications, has rich operation, administration, and maintenance (OAM) and a powerful tandem connection monitor (TCM) capability and out-of-band forward error correction (FER) capability, can implement flexible scheduling and management of a large-capacity service, and is increasingly becoming a mainstream technology of a backbone transport network. Currently, the OTN is expanding from a backbone, a metropolitan area core, and metropolitan area convergence to a metropolitan area access network, and application of the OTN down to a central office (CO) has become an industry consensus.

An existing transport network and access network are independent of each other, and the transport network and the access network use different network technologies. Therefore, a service interconnection cannot be directly implemented, a CO node (such as an OLT device) needs to parse a data service exchanged between the transport network and the access network, and service routing or switching connection is completed using a router or a switch, causing extremely high costs and an extremely high transmission latency.

SUMMARY

This application provides a service signal processing method and a device, to implement low-latency transmission.

According to a first aspect, this application provides a service signal processing method. The method includes: An ONU receives a service signal; the ONU maps the service signal to a flexible optical service unit frame; and the ONU sends a first passive optical network transmission convergence frame to an OLT, where the flexible optical service unit frame is encapsulated in the first passive optical network transmission convergence frame, and where the flexible optical service unit frame is used to carry the service signal in a PON and an OTN. In this application, the flexible optical service unit frame can be transmitted in both the PON and the OTN, and the ONU and the OLT do not need to parse the service signal. Therefore, a latency can be reduced. In addition, a flexible optical service unit frame transmitted in a PON system may be transmitted in an OTN, thereby simplifying interworking between the PON system and an OTN system.

According to a second aspect, an embodiment of this application provides a service signal processing method. The method includes: An OLT receives a first passive optical network transmission convergence frame sent by an ONU, where the first passive optical network transmission convergence frame includes a first flexible optical service unit frame, and where the first flexible optical service unit frame is used to carry a first service signal in a PON and an OTN; and the OLT sends a first optical transport unit OTU frame to a device in the OTN, where the first OTU frame carries the first flexible optical service unit frame. In this application, the flexible optical service unit frame can be transmitted in both the PON and the OTN, and the ONU and the OLT do not need to parse the service signal. Therefore, a latency can be reduced. In addition, a flexible optical service unit frame transmitted in a PON system may be transmitted in an OTN, thereby simplifying interworking between the PON system and an OTN system.

According to a third aspect, an embodiment of this application provides a service signal processing method. The method includes: An ONU receives a passive optical network transmission convergence frame sent by an OLT, where the passive optical network transmission convergence frame includes a flexible optical service unit (OSU) frame (also referred herein in as "OSUflex frame"), and the flexible optical service unit frame is used to carry a service signal in a PON and an OTN; the ONU obtains the service signal from the flexible optical service unit frame; and the ONU sends the service signal. In this application, the ONU may receive the OSUflex frame sent by the OLT and map the OSUflex frame to the service signal, and does not need to parse the service signal carried in the OSUflex frame, thereby reducing a latency in a transmission process.

According to a fourth aspect, this application provides a service signal processing method. The method includes: An OLT receives an OTU frame sent by a device in an OTN, where the OTU frame includes a flexible optical service unit frame; the OLT encapsulates the flexible optical service unit frame in a passive optical network transmission convergence frame; and the OLT sends the passive optical network transmission convergence frame to an ONU, where the flexible optical service unit frame is used to carry a service signal in a PON and the OTN.

According to a fifth aspect, this application provides an ONU. The ONU has a function of implementing the ONUs in the methods in the first aspect and the third aspect. The function may be implemented by hardware, or may be implemented by hardware executing corresponding software. The hardware or the software includes one or more modules corresponding to the foregoing function.

According to a sixth aspect, this application provides an OLT. The OLT has a function of implementing the OLTs in the methods in the second aspect and the fourth aspect. The function may be implemented by hardware, or may be implemented by hardware executing corresponding software. The hardware or the software includes one or more modules corresponding to the foregoing function.

According to a seventh aspect, this application provides a PON system, including an OLT configured to perform any one of the second aspect, the fourth aspect, or all optional manners of the second aspect or the fourth aspect, and an ONU configured to perform any one of the first aspect, the third aspect, or all optional manners of the first aspect or the third aspect.

For beneficial effects of a service signal processing device or system provided in the fifth aspect to the seventh aspect and possible designs of the fifth aspect to the seventh aspect, refer to the beneficial effects brought by the first aspect to the fourth aspect and the possible implementations of the first aspect to the fourth aspect. Details are not described herein again.

According to an eighth aspect, this application provides a service signal processing device, including a memory and a processor, where the memory is configured to store program instructions; and the processor is configured to invoke the program instructions in the memory to perform the service signal processing method in any one of the first aspect and the possible designs of the first aspect, the service signal processing method in any one of the second aspect and the possible designs of the second aspect, the service signal processing method in any one of the third aspect and the possible designs of the third aspect, or the service signal processing method in any one of the fourth aspect and the possible designs of the fourth aspect.

According to a ninth aspect, this application provides a readable storage medium. The readable storage medium stores executable instructions. When at least one processor of a service signal processing device executes the executable instructions, the service signal processing device performs the service signal processing method in any one of the first aspect and the possible designs of the first aspect, the service signal processing method in any one of the second aspect and the possible designs of the second aspect, the service signal processing method in any one of the third aspect and the possible designs of the third aspect, or the service signal processing method in any one of the fourth aspect and the possible designs of the fourth aspect.

According to a tenth aspect, this application provides a program product. The program product includes executable instructions, and the executable instructions are stored in a readable storage medium. At least one processor of a service signal processing device may read the executable instructions from the readable storage medium, and the least one processor executes the executable instructions, to enable the service signal processing device to implement the service signal processing method in any one of the first aspect and the possible designs of the first aspect, the service signal processing method in any one of the second aspect and the possible designs of the second aspect, the service signal processing method in any one of the third aspect and the possible designs of the third aspect, or the service signal processing method in any one of the fourth aspect and the possible designs of the fourth aspect.

DESCRIPTION OF EMBODIMENTS

The following describes the technical solutions in embodiments of this application with reference to accompanying drawings in embodiments of this application. In the descriptions of this application, unless otherwise specified, "a plurality of" means two or more. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. "A and/or B" in this application may be construed as any one of A or B or including A and B.

In a transmission path of an existing PON system 100, a network processor or traffic management module at each level needs to consume a latency of microseconds to tens of microseconds to perform forwarding processing and quality of service control on an Ethernet packet. This application provides a service signal processing method and a device, to reduce or eliminate a latency caused by forwarding processing and quality of service control performed by a network processor or traffic management module on a packet in a PON system, thereby implementing low-latency transmission. In this application, a first flexible optical service unit framing/second service signal obtaining layer is added to an ONU. The first flexible optical service unit framing layer slices an upstream service signal and maps upstream service signal slices obtained after the slicing to flexible optical service unit frames. The flexible optical service unit frame has different lengths based on different services. This is not limited in this embodiment of this application. During transmission of the flexible optical service unit frame to an OLT, the OLT obtains the flexible optical service unit frame, and encapsulates the flexible optical service unit frame in an OTU frame and then sends the OTU frame to an OTN, and the OLT does not need to parse the service signal. Therefore, a latency can be reduced, and interworking between the OLT and the OTN can be achieved. The following describes the technical solutions of this application in detail with reference to the accompanying drawings.

Figure 1:
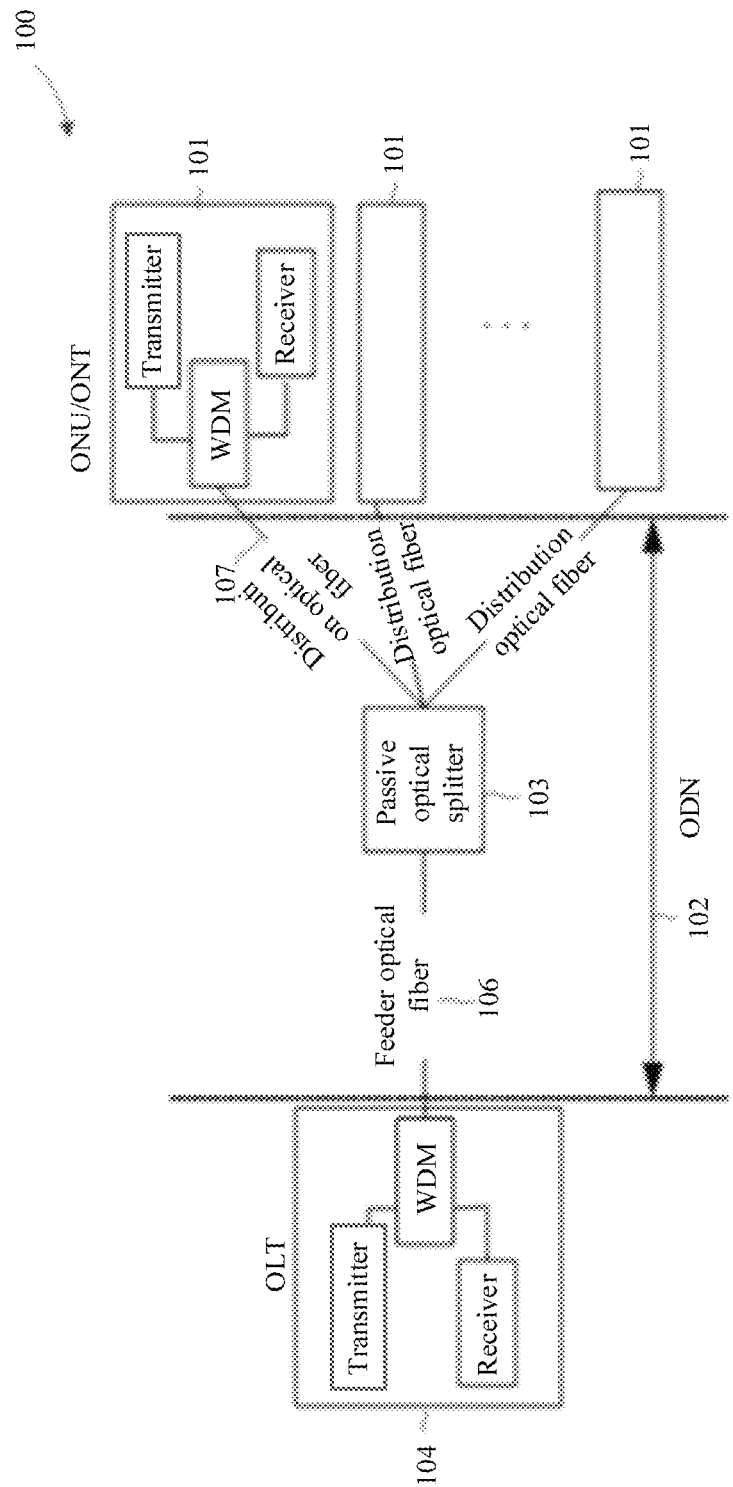
FIG. 1 is a schematic diagram of a structure of a PON system.
Figure 2:
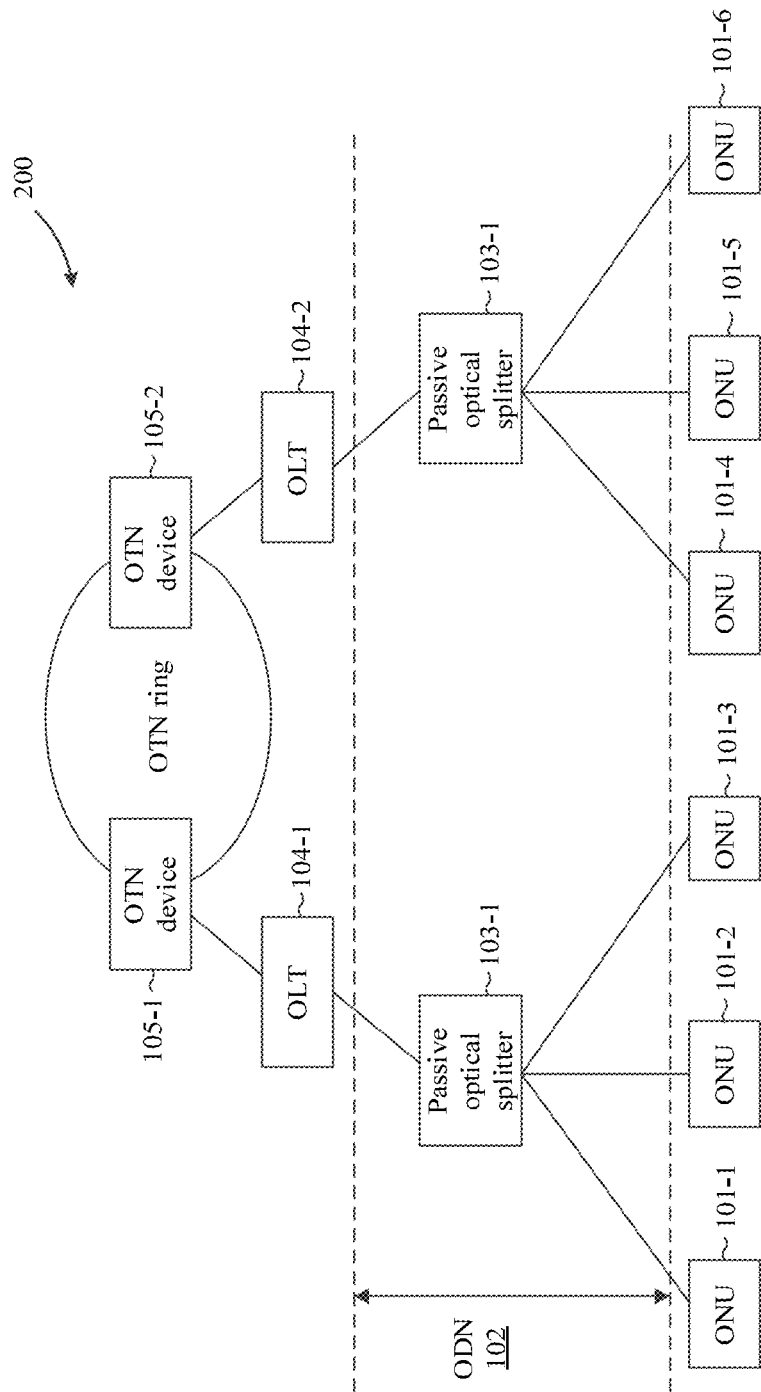
FIG. 2 is a schematic diagram of a structure of a PON system according to this application.

FIG. 2 is a schematic diagram of a structure of a system according to an embodiment of this application. As shown in FIG. 2, an OLT 104-1 communicates with an OTN device 105-1 in an optical transport network (OTN). The OLT 104-1 sends a packet of an ONU (101-1, 101-2, or 101-3) to the OTN device 105-1, and sends the packet to a peer ONU (101-4, 101-5, or 101-6) using an OTN device 105-2. The OLT 104-1 further receives a packet sent by the OTN device 105-1, and sends, to the ONU (101-1, 101-2, or 101-3) using an ODN 102, the received packet sent by the OTN device 105-1. The OTN may be used as a bearer network of a PON, to improve a transmission distance of a PON service or provide better service protection.

The technical solutions of this application are applied to a PON system, and in particular, may be applied to a representative gigabit passive optical network (GPON), an Ethernet passive optical network (EPON), an XG(S)-PON (10 G (symmetric) Passive Optical Network), a 10 G EPON (10 G Ethernet Passive Optical Network), a 25 G EPON, a 40 G EPON, a 50 G EPON, and a 100 G EPON. The XG(S)-PON, the 10 G EPON, the 25 G EPON, the 40 G EPON, the 50 G EPON, and the 100 G EPON may be collectively referred to as a 10 G PON or an XGPON.

Figure 3A:
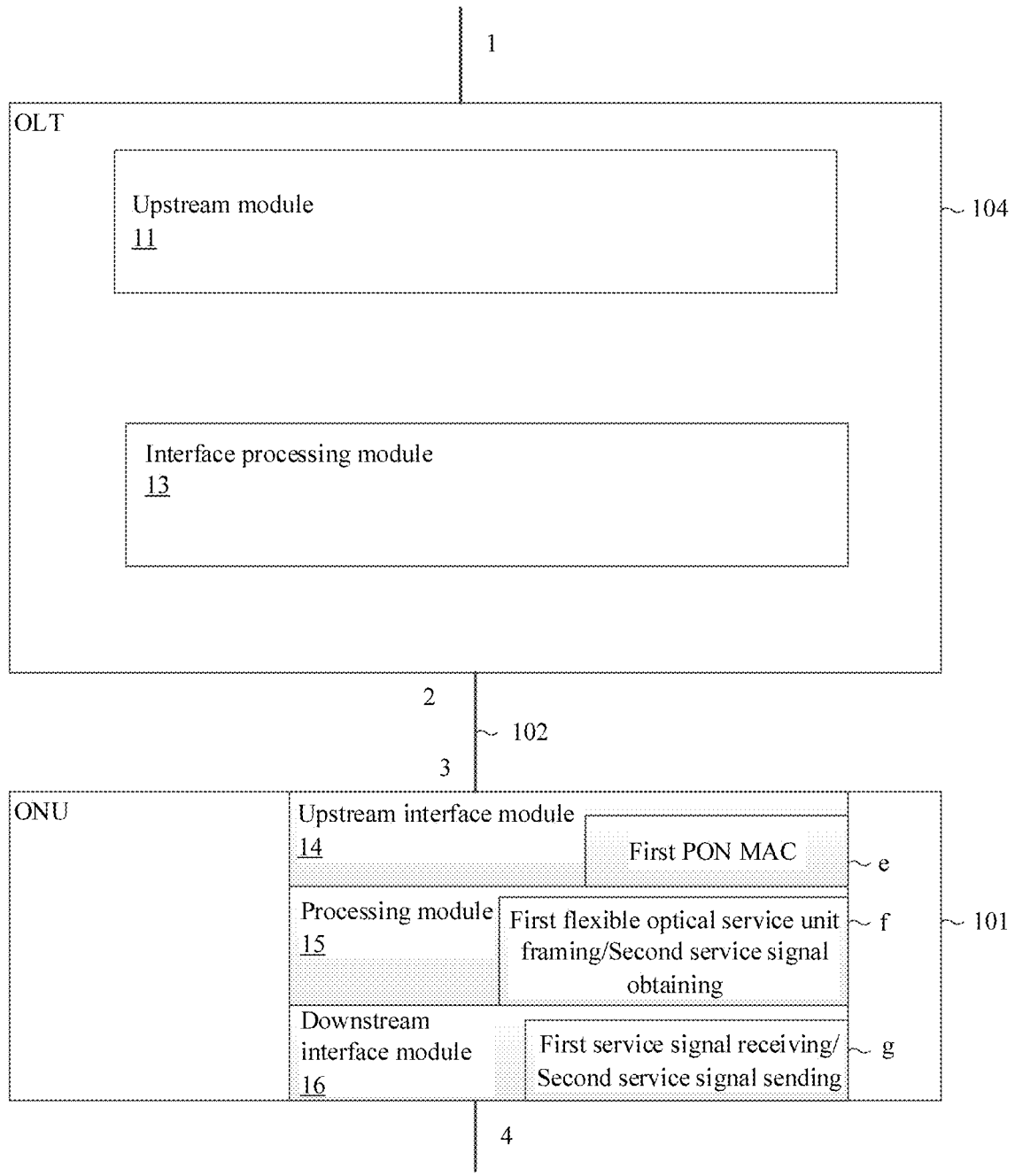
FIG. 3A is a schematic diagram of a structure of a PON system according to this application.

The PON system includes an ONU 101, an ODN 102, and an OLT 104. FIG. 3A is a schematic diagram of a structure of an embodiment of a PON system according to this application. As shown in FIG. 3A, the PON system includes an OLT 104, an ODN 102, and an ONU 101.

The ONU 101 includes an upstream interface module 14, a processing module 15, and a downstream interface module 16.

The downstream interface module 16 is configured to receive a first service signal sent by user equipment.

The processing module 15 is configured to map the first service signal to a first flexible optical service unit. A flexible optical service unit frame (OSUflex frame) is a service bearer container of a future optical transport network (OTN). A value of a rate of the flexible optical service unit depends on a rate of a carried service, and the flexible optical service unit may carry a constant bit rate (CBR) service and a packet (PKT) service. It should be noted that the flexible optical service unit may alternatively have another name, such as a flexible optical service data unit (OSDUflex). Any frame that can carry a data signal in both a PON and an OTN may be referred to as a flexible optical service unit frame.

The upstream interface module 14 is configured to send a first passive optical network transmission convergence frame to the OLT 104, where the first flexible optical service unit frame is encapsulated in the first passive optical network transmission convergence frame. The passive optical network transmission convergence frame includes a gigabit passive optical network transmission convergence GTC frame used in a GPON, an XGTC frame used in an XG PON, and any transmission convergence frame used in a PON such as a 25 G PON or a 50 G PON. For ease of description, an XGTC frame and an OSUflex frame are subsequently used as examples for description in the embodiments of this application.

Optionally, the upstream interface module 14 is further configured to receive a fourth passive optical network transmission convergence frame sent by the OLT 104, where the fourth passive optical network transmission convergence frame carries a second flexible optical service unit frame.

The processing module 15 obtains a second service signal from the second flexible optical service unit frame.

The OLT 104 includes an upstream module 11 and an interface processing module 13. The interface processing module 13 is configured to receive the first passive optical network transmission convergence frame sent by the ONU 101, where the first flexible optical service unit frame is encapsulated in the first passive optical network transmission convergence frame. The upstream module 11 is configured to send a first optical channel data unit (ODU) frame to a device in an OTN, where the ODU frame carries the first flexible optical service unit frame.

Figure 3B:
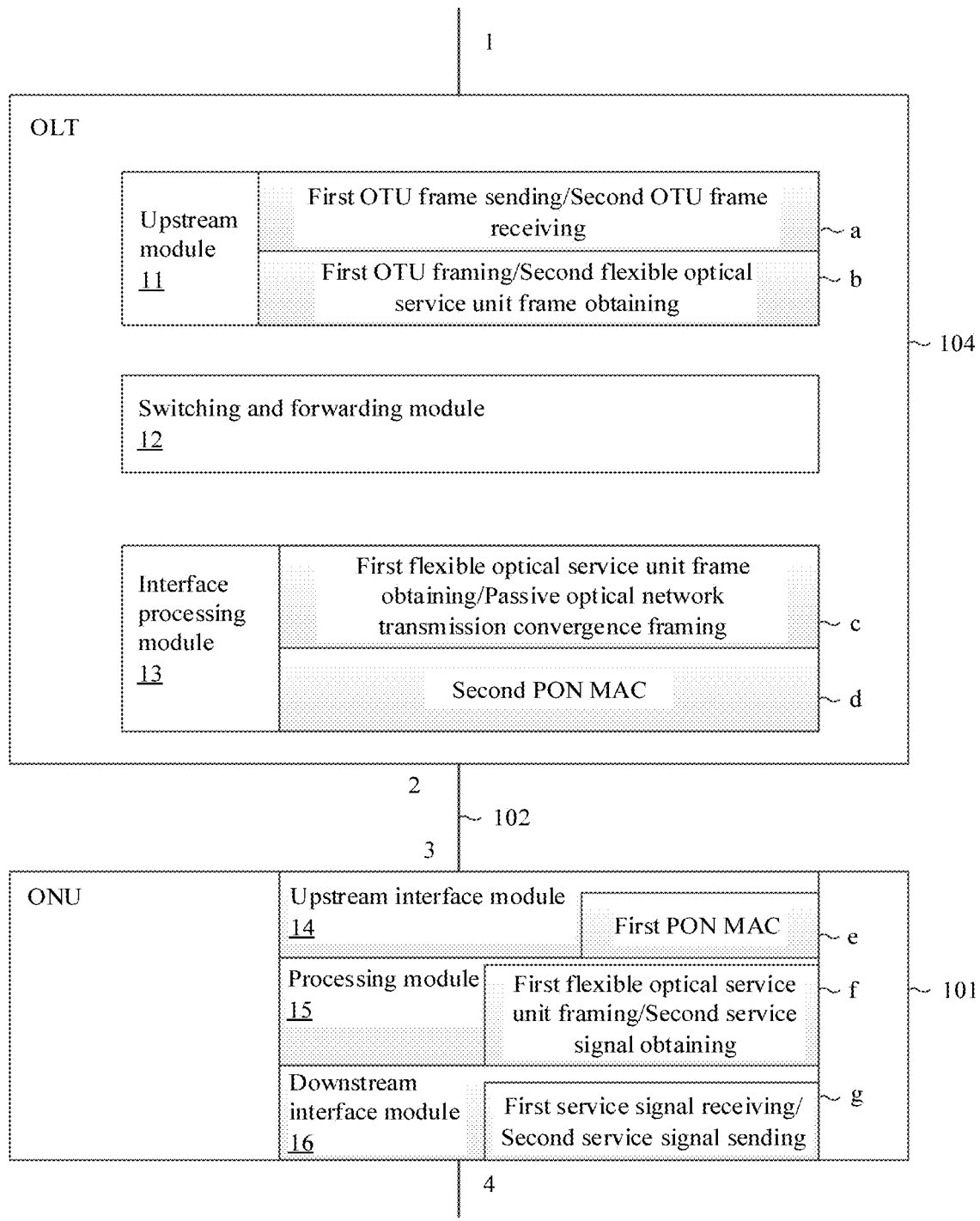
FIG. 3B is a schematic diagram of a structure of a PON system according to this application.

FIG. 3B is a schematic diagram of a structure of an embodiment of a PON system according to this application. As shown in FIG. 3B, the PON system includes an OLT 104, an ODN 102, and an ONU 101.

The OLT 104 includes an upstream module 11, a switching and forwarding module 12, and an interface processing module 13. The upstream module 11 includes a first OTU frame sending/second OTU frame receiving layer a and a first OTU framing/second flexible optical service unit frame obtaining layer b. The interface processing module 13 includes a first flexible optical service unit frame obtaining/passive optical network transmission convergence framing layer c and a second PON medium access control (MAC) layer d. The second PON MAC layer d is configured to receive an upstream signal sent by the ONU, such as, a first passive optical network transmission convergence frame. The first flexible optical service unit frame obtaining layer c is configured to: obtain a first flexible optical service unit frame carried in the first passive optical network transmission convergence frame, and send the first flexible optical service unit frame to the first OTU framing layer b of the upstream module 11 using the switching and forwarding module 12. The first OTU framing layer b maps the received first flexible optical service unit frame to a first OTU frame, and the first OTU frame sending layer a sends the first OTU frame to a device in an optical transport network (OTN). In addition, the second OTU frame receiving layer a of the upstream module 11 is configured to receive a second OTU frame sent by the device in the OTN, and the second flexible optical service unit frame obtaining layer b is configured to: obtain a second flexible optical service unit frame encapsulated in the second OTU frame, and send the second flexible optical service unit frame to the passive optical network transmission convergence framing layer c using the switching and forwarding module 12. The passive optical network transmission convergence framing layer c is configured to: encapsulate the second flexible optical service unit frame in a fourth passive optical network transmission convergence frame, and send the fourth passive optical network transmission convergence frame to the ONU 101 using the second PON MAC layer d.

It should be noted that the first flexible optical service unit frame obtaining/passive optical network transmission convergence framing layer c may be alternatively located in the second PON MAC layer. The switching and forwarding module 12 in the OLT 104 is an optional module, and the OLT 104 may not include the switching and forwarding module.

The ONU 101 includes an upstream interface module 14, a processing module 15, and a downstream interface module 16. The upstream interface module 14 includes an upstream interface 3, a first PON MAC layer e. The processing module 15 includes a first flexible optical service unit framing/second service signal obtaining layer f. The downstream interface module 16 includes a first service signal receiving/second service signal sending layer g and a downstream interface 4. The upstream interface module 14 is configured to interact with the OLT 104 using the upstream interface 3, to send the first passive optical network transmission convergence frame generated using the first PON MAC layer e to the OLT 104, where the first passive optical network transmission convergence frame carries the first flexible optical service unit frame. The upstream interface module 14 is further configured to: receive, using the upstream interface 3, the fourth passive optical network transmission convergence frame sent by the OLT 104, and parse the received fourth passive optical network transmission convergence frame using the first PON MAC layer e, to obtain the second flexible optical service unit frame carried in the fourth passive optical network transmission convergence frame, and obtain a second service signal carried in the second flexible optical service unit frame.

It should be noted that, in this embodiment of this application, an XGTC frame is transmitted between an OLT and an ONU in an XGPON. However, this manner may also be applied to other PONs, such as a GPON, a 10 G PON, a 25 G PON, a 50 G PON, a 40 G PON, and a 100 GPON, provided that the foregoing described XGTC frame is replaced with a corresponding passive optical network transmission convergence frame, such as a GTC frame.

The downstream interface module 16 is configured to interact with a user equipment (not shown in the figure) using the downstream interface 4, to receive a first service signal sent by the user equipment. The downstream interface module 16 is further configured to send, to the user equipment using the downstream interface 4, the second service signal recovered by the second service signal layer f. It should be noted that the layer in this embodiment is a function layer corresponding to an internal processing procedure.

The flexible optical service unit framing layer f included in the processing module 15 is configured to map the service signal to the OSUflex frame. The service signal layer f included in the processing module is configured to restore the second flexible optical service unit frame to the second service signal.

In this embodiment of this application, "/" is used to distinguish between upstream and downstream. For example, for the first OTU framing/second flexible optical service unit frame obtaining layer b, the first OTU framing layer b is configured to perform, during upstream, OTU framing on the first OSUflex frame to generate the first OTU frame, and the second flexible optical service unit frame obtaining layer is configured to obtain the second OSUflex frame from the downstream second OTU frame; and for the first flexible optical service unit framing/second service signal obtaining layer f, the first OSUflex framing layer f is configured to map, during upstream, the first service signal to the OSUflex frame, and the second service signal layer is configured to obtain, during downstream, the second service signal from the received second OSUflex frame.

Figure 4A:
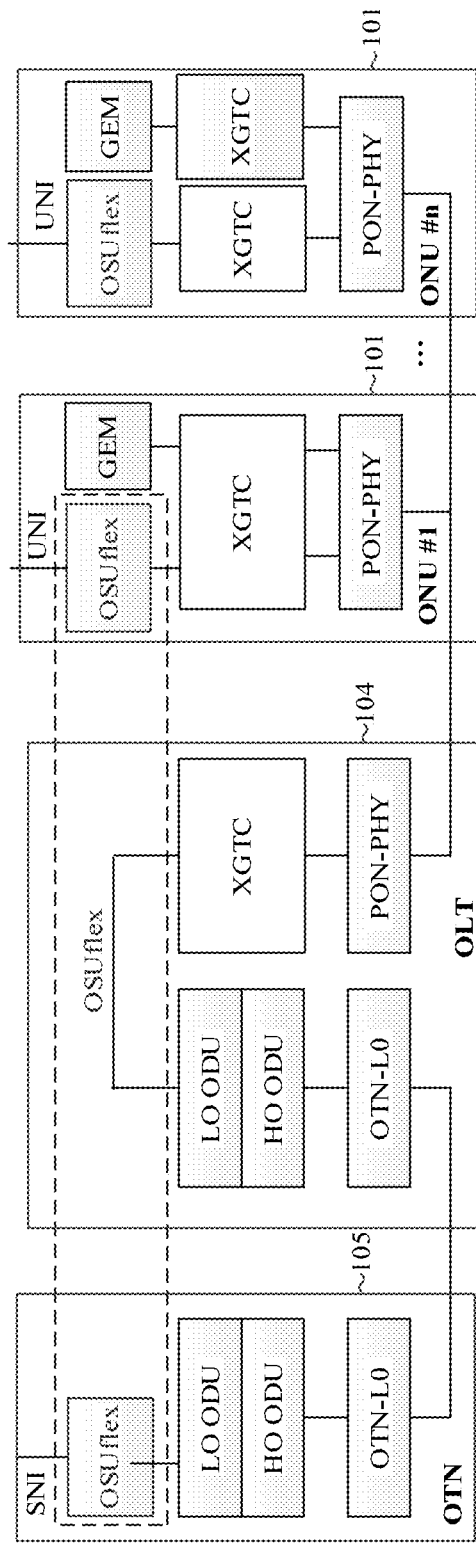
FIG. 4A is a schematic diagram of an embodiment in which an OSUflex is transmitted from an ONU to an OTN or from the OTN to the ONU according to this application.

FIG. 4A is a schematic diagram of an embodiment in which an OSUflex is transmitted from an ONU to an OTN or from the OTN to the ONU according to this application. In the embodiment shown in FIG. 4A, an OTN device 105 on an OTN side maps a service of a user corresponding to each ONU to an OSUflex, where the OSUflex carries an OAM overhead. The OSUflex is mapped to an ODUk, an ODUflex, or an ODUcn, and is sent to an OLT 104 (where ODU refers to optical data unit). After receiving a message that carries the OSUflex and that is sent by the OTN, the OLT 104 maps the OSUflex carried in the ODU to an XGTC frame, and sends the XGTC frame to an ONU 101 using an XGTC message.

The service corresponding to the user may be a television live broadcast service: The OTN device 105 constructs an OSUflex #1, an OSUflex #2, . . . , and an OSUflex #m, respectively corresponding to m real-time channels to the OLT 104. Based on a customer requirement, choose to send a corresponding OSUflex #i to the user endpoint ONU 101 in a switching manner. Based on a customer requirement, the OLT 104 chooses to send a corresponding OSUflex #i to the user endpoint ONU in a switching manner.

Alternatively, the service corresponding to the user may be a video on demand service (such as high definition, 4k, or 8k), a game service (such as an augmented reality (AR) service), a virtual reality (VR) service, or another service, such as a web page, a voice, or an email.

A service signal in this application may be an Ethernet service signal, an E1 service signal, a synchronous digital hierarchy (SDH) service signal, or a video service signal.

FIG. 4A is a schematic diagram of an embodiment in which an OSUflex is transmitted from an ONU to an OTN or from the OTN to the ONU according to this application. In the embodiment corresponding to FIG. 4A, an OTN-L0 represents an optical network layer 0, and is configured to complete optical carrier multiplexing and scheduling transmission. An HO ODU represents a higher-order ODU layer, and completes multiplexing of a plurality of lower-order ODU signals. The multiplexing means that a plurality of lower-speed services (such as ODU frames used to map bearer service data or OSUflex signals) are transmitted after being converged into one high-speed service. An LO ODU represents a lower-order ODU layer, and is configured to map bearer service data or an OSUflex signal. An SNI is a service network interface. The PON represents an access network. A PON-PHY represents a passive optical network physical layer, and is configured to complete optical carrier distribution and transmission. GTC represents a GPON transmission convergence layer, is configured to complete multiplexing of a plurality of GEM signals. A GEM represents a GPON encapsulation mode layer, and is configured to map bearer service data. A UNI is a user network interface. An OSUflex of each of the OTN, an OLT, and the ONU represents a transmission access service bearer layer, and is configured to complete unified mapping bearing of service data. In addition, because another passive optical network may be used, a GEM frame may be alternatively any passive optical network encapsulation frame, such as an XGEM frame or another frame. This is not limited in this embodiment of this application.

Figure 4B:
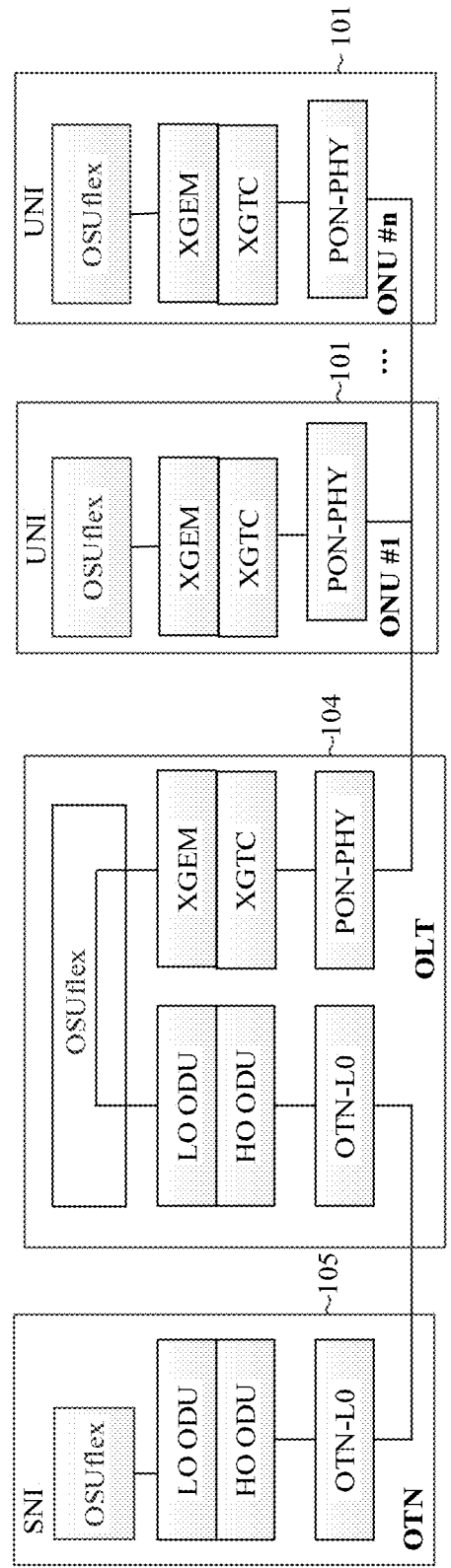
FIG. 4B is a schematic diagram of another embodiment in which an OSUflex is transmitted from an ONU to an OTN or from the OTN to the ONU according to this application.

FIG. 4B is a schematic diagram of another embodiment in which an OSUflex is transmitted from an ONU to an OTN or from the OTN to the ONU according to this application. Different from the embodiment corresponding to FIG. 4A, during transmission in a PON system, an OSUflex is sent to an ONU 101 by being mapped to a GEM frame, or is sent by the ONU 101 to an OLT 104.

Figure 4C:
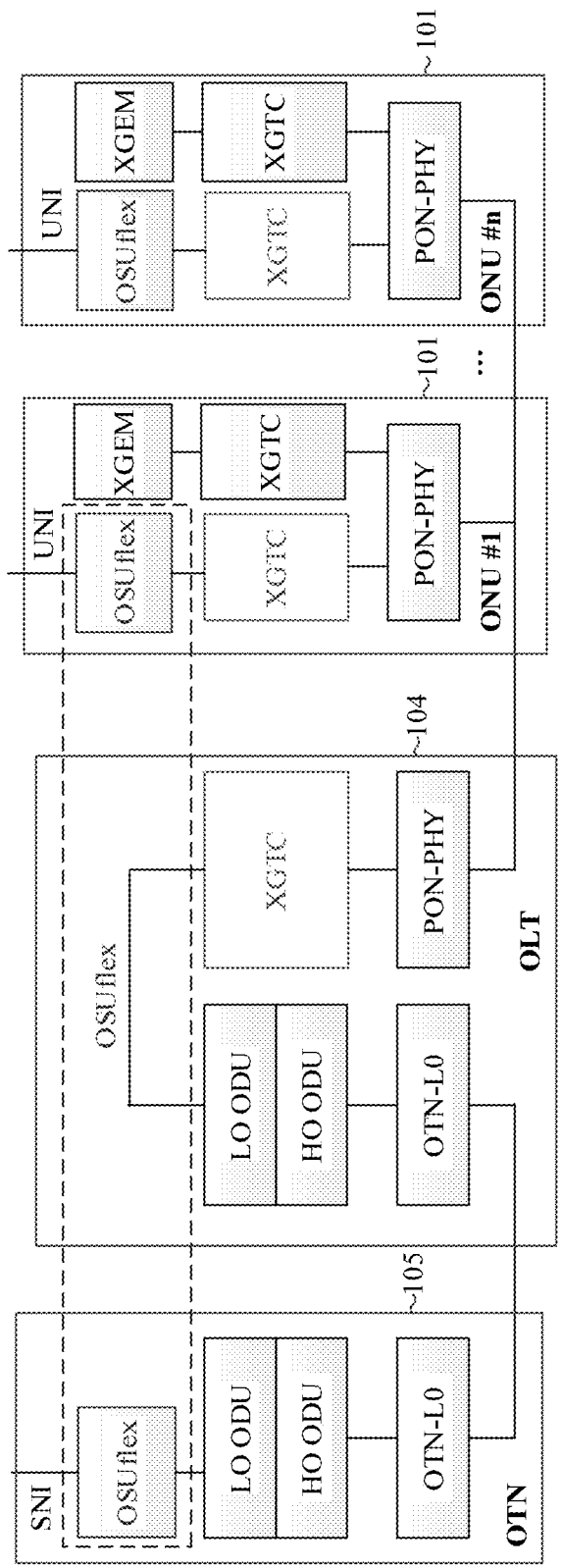
FIG. 4C is a schematic diagram of another embodiment in which an OSUflex is transmitted from an ONU to an OTN or from the OTN to the ONU according to this application.

FIG. 4C is a schematic diagram of another embodiment in which an OSUflex is transmitted from an ONU to an OTN or from the OTN to the ONU according to this application. Different from the embodiment corresponding to FIG. 4A, during transmission in a PON system, although an OSUflex is mapped to a GTC frame, a payload area is defined as an OTN-class frame structure based on an actual rate of the OSUflex. Bytes whose quantity meets an integer multiple of 4 are selected to construct an OTN-class frame, and a remaining byte is reserved for later use. Overheads of the first 16 columns of the payload area whose length is the selected bytes whose quantity is the integer multiple of 4 are consistent with overheads of the first 16 columns of an OTN frame, and remaining space is divided into slots in a consistent manner with the OTN frame.

That is, in the PON system, the OLT 104 or the ONU 101 maps an OSUflex to an OTN-class frame (also referred to as an improved GTC frame), or multiplexes an OSUflex to an ODUk/ODUflex through mapping, and then maps the ODUk/ODUflex to an OTN-class frame (an improved XGTC frame or GTC frame). Accessing an XGPON through pass-through using an OSUflex or an ODUk/ODUflex does not affect an original GPON or XGPON technology.

Figure 5A:
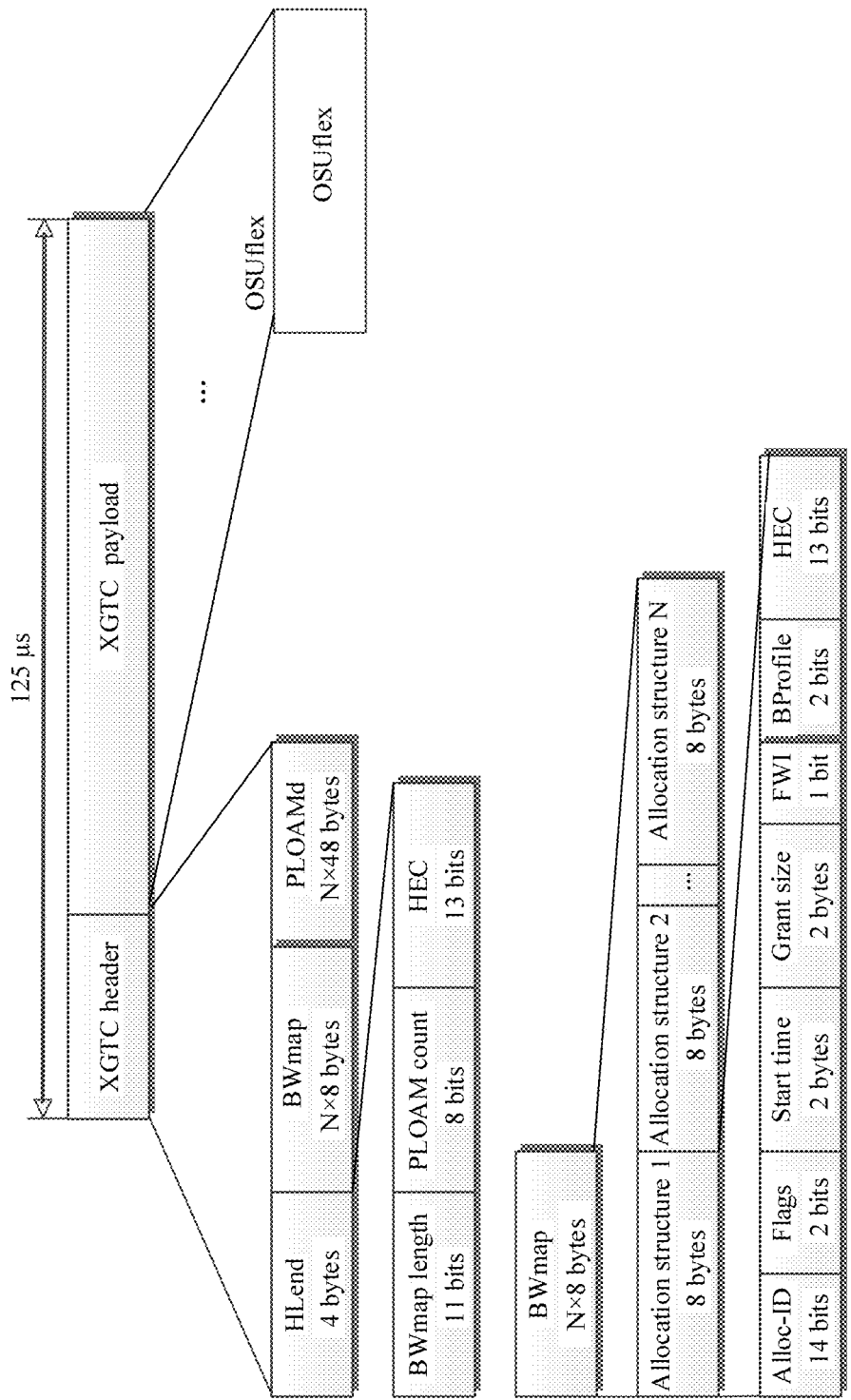
FIG. 5A is a schematic diagram of a data structure in which an OSUflex frame is mapped to a payload area of a 10-Gigabit (10G)-PON (XG-PON) transmission convergence (XGTC) frame in a downstream direction according to an embodiment of this application.

FIG. 5A is a schematic diagram of a data structure in which an OSUflex frame is mapped to a payload area of an XGTC frame (or a GTC frame or another passive optical network transmission convergence frame) in a downstream direction according to an embodiment of this application. The data structure is applicable to the scenario in FIG. 4A. The OSUflex is carried in a payload of the XGTC frame.

That is, the XGTC frame is partially replaced, an XGTC frame header field is reserved, and an XGTC frame payload part is replaced with a complete OSUflex frame. The XGTC header field is consistent with an existing XGTC header field. Details are not described herein in this embodiment of this application. In the structure shown in FIG. 5A, a function of a tributary port number (TPN) of the OSUflex frame is the same as a function of a Port-ID of an existing XGEM frame. Because the OSUflex frame is a fixed-length frame, an ONU can correctly identify borders of the OSUflex frame using a length of the OSUflex frame.

The XGTC frame in FIG. 5A includes the XGTC frame header field and the XGTC frame payload. The XGTC frame header field includes 4-byte HLend, an Nx8-byte bandwidth map (BWmap), and Nx48-byte physical layer operation, administration and maintenance. HLend indicates other header fields, such as a BWmap, a PLOAM count, and HEC that protects an HLend field byte error. The bandwidth map BWmap indicates a description allocated to the ONU. The BWmap includes one or more structures (allocation structure) allocated to the ONU. Each allocation description (allocation structure) includes an allocation identifier (Alloc-ID), used to identify a T-CONT allocated to the ONU, and Start time and End time indicate data sending start time and data sending end time of the ONU. The T-CONT identified by the Alloc-ID is used to carry service data of the ONU.

Figure 5B:
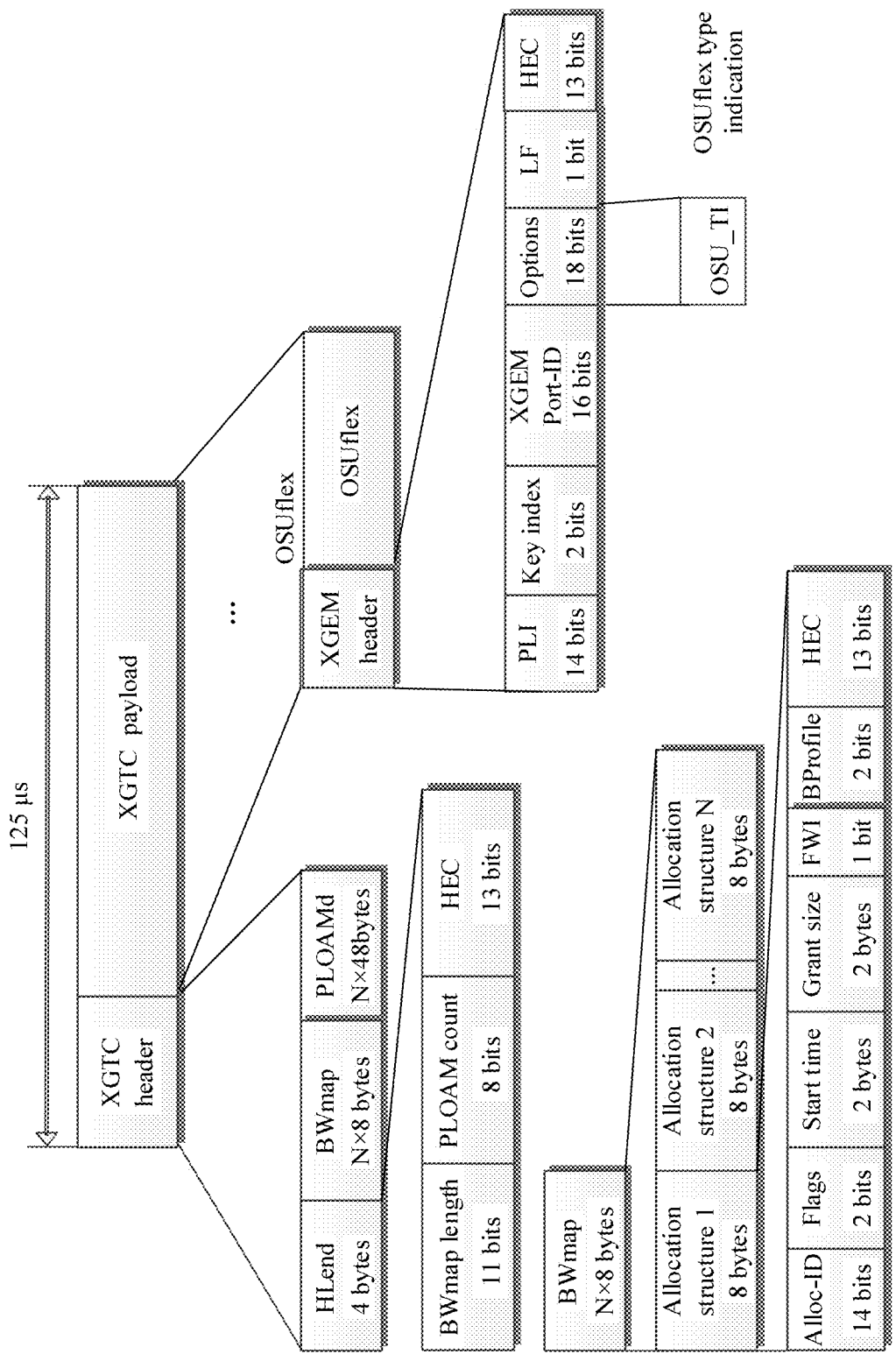
FIG. 5B is a schematic diagram of another data structure in which an OSUflex frame is mapped to a payload area of an XGTC frame in a downstream direction according to an embodiment of this application.

FIG. 5B is a schematic diagram of a data structure in which an OSUflex is mapped to an XGTC frame (or a GTC frame) in a downstream direction according to an embodiment of this application. The data structure is applicable to the scenario in FIG. 4B. Different from the data structure shown in FIG. 5A, in the XGTC frame in FIG. 5B, the OSUflex is carried in an XGEM (or a GEM) frame payload part, and an XGEM header field and the OSUflex are carried in a payload of the XGTC frame. It should be noted that there is no structural difference between an upstream OSUflex frame and a downstream OSUflex frame.

That is, the XGEM frame is partially replaced, an XGEM frame header is reserved, and the XGEM frame payload part is replaced with a complete OSUflex frame. That is, one OSUflex frame is mapped to a payload area of one XGEM frame, and an XGEM Port-ID is the same as a tributary port number (TPN) of the OSUflex frame. The XGEM frame header field includes an OSUflex type indication OSU_TI, used to indicate that the XGEM frame carries the OSUflex frame. An XGTC header field is consistent with an existing XGTC header field. Details are not described herein in this embodiment of this application.

Figure 5C:
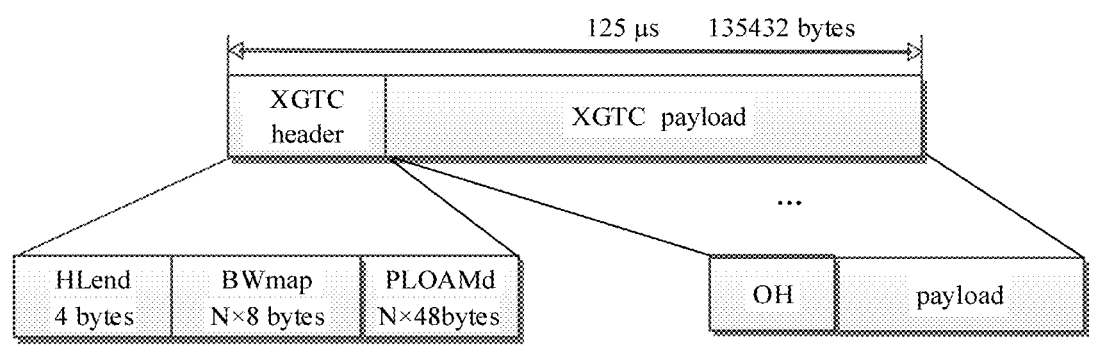
FIG. 5C is a schematic diagram of another data structure in which an OSUflex frame is mapped to a payload area of an XGTC frame in a downstream direction according to an embodiment of this application.

FIG. 5C is a schematic diagram of a data structure in which an OSUflex is mapped to an OTN-class frame in a downstream direction according to an embodiment of this application. The data structure is applicable to the scenario in FIG. 4C. The OTN-class frame is carried in an XGTC frame payload part. The OTN-class frame includes an overhead OH and a payload payload, and the OSUflex frame is carried in the payload of the OTN-class frame. An XTGC frame payload may carry one or more OTN-class frames. In this embodiment of this application, a quantity of OTN-class frames carried in an XTGC frame is not limited.

Figure 5D:
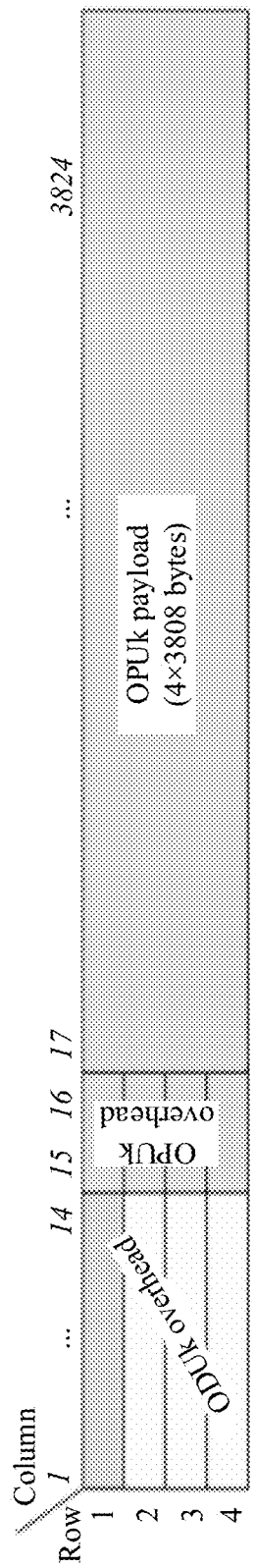
FIG. 5D is a schematic diagram of a structure of an OTN-class frame according to an embodiment of this application.

FIG. 5D is a schematic diagram of a structure of an OTN-class frame according to an embodiment of this application. Referring to FIG. 5D, the OTN-class frame includes a same header field as an OTN frame, for example, includes an OTU frame header field, an ODUk header field, or an OPUk header field. An OSUflex frame is mapped to an OPUk frame payload area. 1 to 14 bytes in the first row and the first column carry a header field of an OTUk frame structure, for example, content of an FA OH and an OTUk OH. For content of the header field of the OTUk frame structure, the ODUk header field, and the OPUk header field, refer to descriptions of the standard G.709. Details are not described herein in this embodiment of this application. A payload of the OTN-class frame includes a structure of four rows of same column bytes.

Figure 5E:
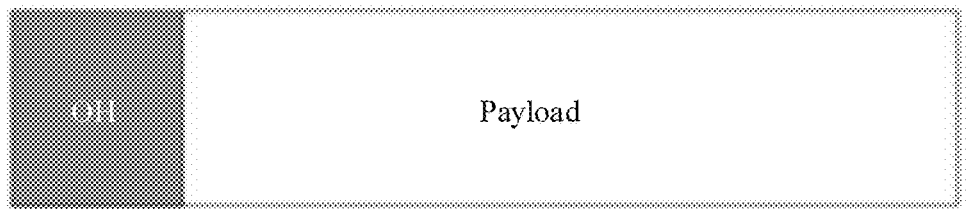
FIG. 5E is a schematic diagram of a structure of a row in a payload of an OTN-class frame according to an embodiment of this application.

For example, in FIG. 5C, a downstream frame has 135432 bytes, where HLend has 4 bytes, a BWmap has Nx8 bytes, and a PLOAMd has Nx48 bytes. It is assumed that after overhead bytes are subtracted from an upstream frame, a payload area size is 135188 bytes. In this embodiment of this application, the structure of the OTN-class frame is constructed using 138188 bytes of an XGTC frame payload area. The OTN-class frame includes a structure of four rows of 33797 columns. In each row of 33797 columns, 16 columns are a header field (an overhead) of the OTN-class frame. FIG. 5E is a schematic diagram of a structure of a row in a payload of an OTN-class frame.

Figure 6A:
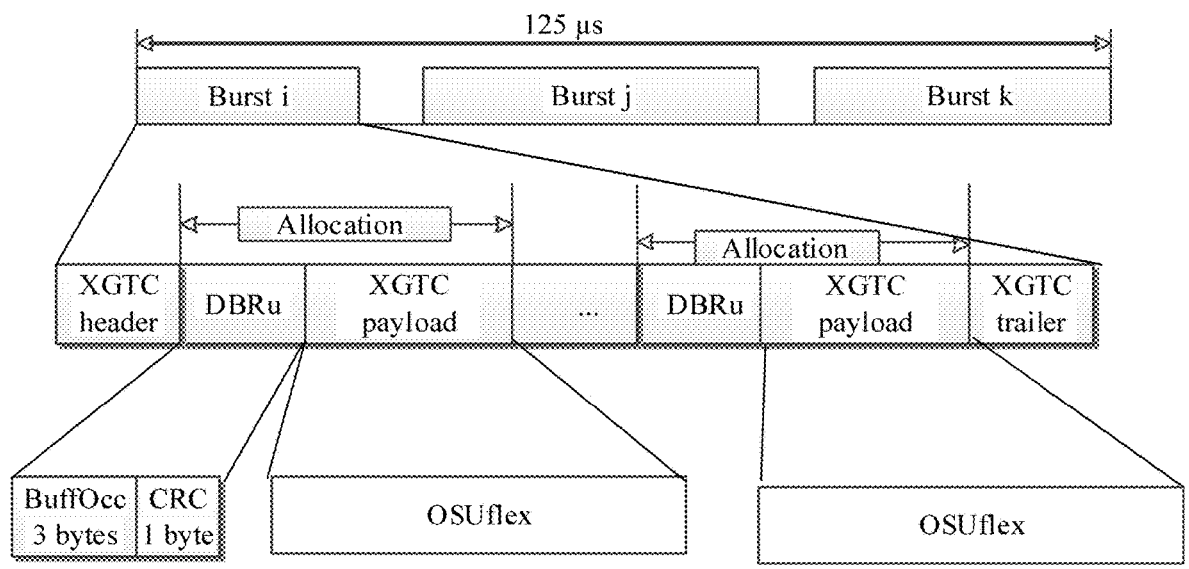
FIG. 6A is a schematic diagram of a structure in which an OSUflex frame and an XGEM frame are mapped to an XGTC frame in a hybrid manner in an upstream direction according to an embodiment of this application.

FIG. 6A is a schematic diagram of a structure in which an OSUflex frame and an XGEM frame are mapped to an XGTC frame in a hybrid manner in an upstream direction according to an embodiment of this application. The structure is applicable to the scenario in FIG. 4A. In the XGTC frame, a burst i to a burst k indicate that there are k-i ONUs, and the k-i ONUs share 125 µs. The burst i is used as an example. The XGTC frame includes an XGTC header field, an XGTC trailer, DBRu, and a XGTC payload. An OSUflex frame is encapsulated in the XGTC payload. In the XGTC frame shown in FIG. 6A, at least one of at least two XGTC frame payloads carries an OSUflex frame. Optionally, the XGTC frame payload may alternatively carry only the OSUflex frame. A quantity and lengths of carried OSUflex frames are not limited herein in this embodiment of this application.

The XGTC frame includes the XGTC frame header, the dynamic bandwidth report upstream (DBRu), the XGTC frame payload, and upstream XGTC frame check (the XGTC Trailer). The XGTC frame payload includes one or more OSUflex frames. For a structure of the OSUflex frame, refer to FIG. 7. The XGTC frame payload is transmitted using a transmission container (T-CONT). Bandwidths occupied by different T-CONTs of a same ONU may be connected together to form one burst, or may be different bursts, and bandwidths occupied by T-CONTs of different ONUs need to be different bursts.

Figure 6B:
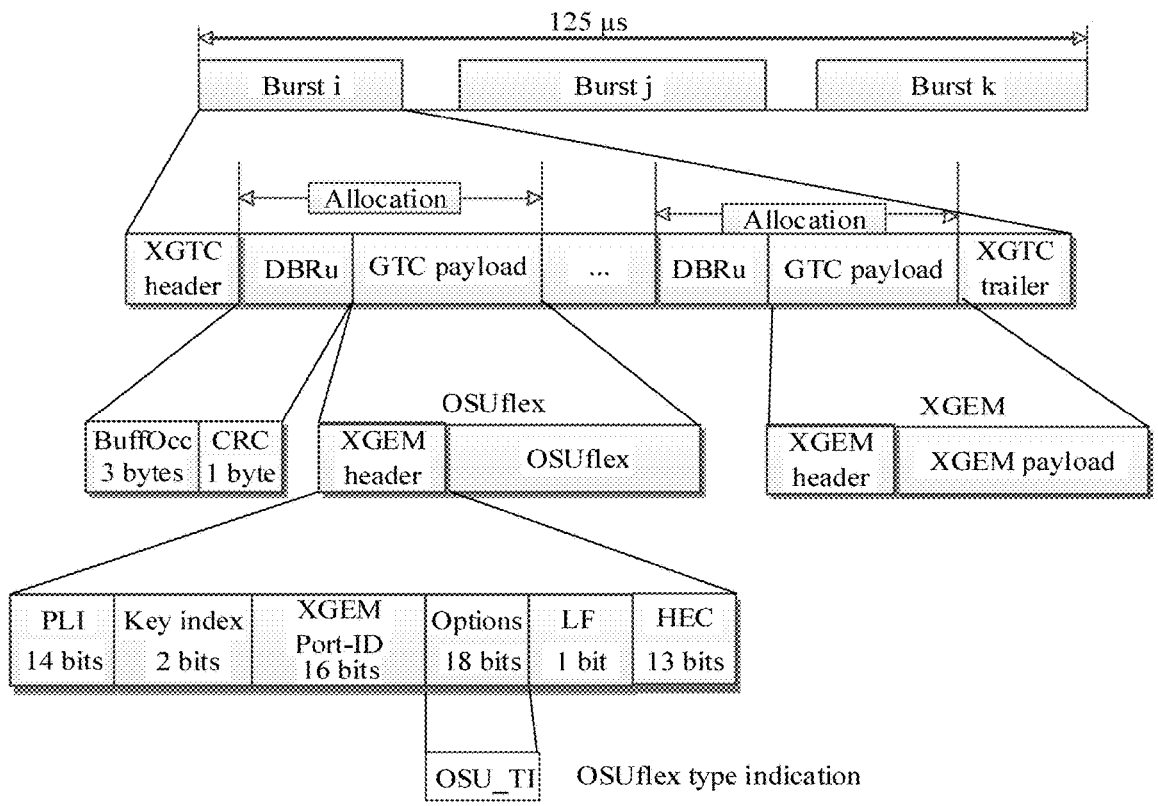
FIG. 6B is a schematic diagram of another structure in which an OSUflex frame and an XGEM frame are mapped to an XGTC frame in a hybrid manner in an upstream direction according to an embodiment of this application.

FIG. 6B is a schematic diagram of a structure in which an OSUflex frame and an XGEM frame are mapped to an XGTC frame in a hybrid manner in an upstream direction according to an embodiment of this application. The structure is applicable to the scenario in FIG. 4B. Different from the structure shown in FIG. 6A, the OSUflex is encapsulated in the XGEM frame, and the XGEM frame is encapsulated in an XGTC frame payload. In the XGTC frame, a burst i to a burst k indicate that there are k-i ONUs, and the k-i ONUs share 125 µs. The burst i is used as an example. The XGTC frame includes an XGTC header field, an XGTC trailer, at least two DBRu fields, and at least two GTC payloads. The GTC payload is in one-to-one correspondence with the DBRu. In the XGTC frame shown in FIG. 6B, at least one of the at least two GTC payloads carries an XGEM frame in which an OSUflex frame is encapsulated. In the XGME frame in which the OSUflex frame is encapsulated, an XGEM header field includes an OSUflex type indication OSU_TI, used to indicate that the XGEM frame carries the OSUflex frame. At least one of the at least two GTC payloads may alternatively carry an XGEM frame in which an XGEM payload is encapsulated.

Figure 6C:
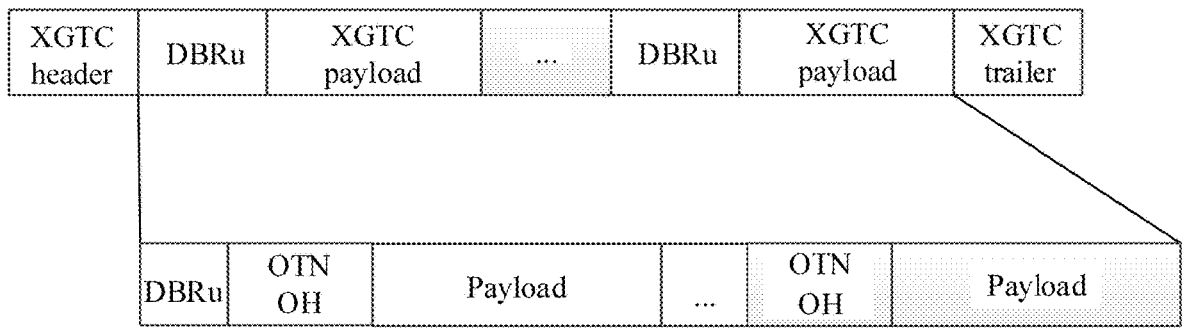
FIG. 6C is a schematic diagram of a structure in which an OSUflex is mapped to an OTN-class frame and the OTN-class frame is encapsulated in an XGTC frame in an upstream direction according to an embodiment of this application.

FIG. 6C is a schematic diagram of a structure in which an OSUflex is mapped to an OTN-class frame and the OTN-class frame is encapsulated in an XGTC frame in an upstream direction according to an embodiment of this application. Upstream ONUs evenly share 125 µs, and an upstream bandwidth is evenly divided into N parts based on a quantity N of ONUs. ONU burst frames reserve necessary burst physical layer overheads, and payload areas are constructed as OTN-class frame structures. Because the ONUs evenly share the upstream bandwidth, no bandwidth reporting of dynamic bandwidth allocation (DBA) is needed, thereby saving DBA report overheads. The XGTC frame in FIG. 6C may include one or more XGTC payloads, and may carry one or more OTN-class frames. A payload of the OTN-class frame carries an OSUflex frame. One XGTC payload may carry one OTN-class frame, or may carry a plurality of OTN-class frames. A quantity and lengths of OTN-class frames carried in an XGTC frame or a GTC frame are not limited in this embodiment of this application.

In the structures in FIG. 6A to FIG. 6C, DBA bandwidth reporting and downstream-direction bandwidth map delivery are canceled, such that static bandwidth allocation can be implemented. In addition, alternatively, a DBA function may be reserved, but the DBA function may be simplified to a function that DBA controls only overall bandwidth allocation between ONUs. In this case, DBA-related overheads are reserved.

Figure 7:
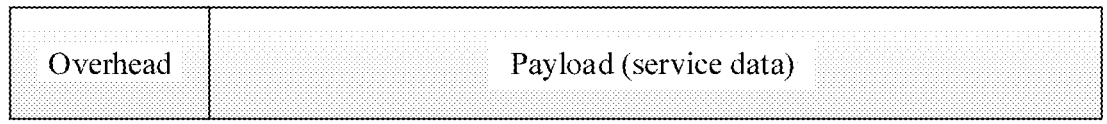
FIG. 7 is a schematic diagram of a data structure of an OSUflex frame according to an embodiment of this application.

FIG. 7 is a schematic diagram of a data structure of an OSUflex frame according to an embodiment of this application. The OSUflex frame includes bytes or bits whose quantity is an integer greater than 1. As shown in FIG. 7, the OSUflex frame includes an overhead area and a payload area. The overhead area includes but is not limited to a service frame header indication, a trail trace identifier (TTI), bit interleaved parity-X (BIP-X), a backward error indication (BEI), a backward defect indication (BDI), a status (STAT) indication, a timestamp, a sequence identifier, a mapping overhead, a tributary port number TPN, or the like. The payload area is used to carry service data. A specific manner of mapping the service data to the payload area of the OSUflex frame is not limited, and may be synchronous mapping or asynchronous mapping. For example, a generic mapping procedure (GMP) may be used. A size of the structure of the OSUflex frame may be 8 bytes, 16 bytes, 32 bytes, 64 bytes, 128 bytes, 192 bytes, 256 bytes, 512 bytes, or the like. This is not limited herein in this embodiment of this application.

TTI: Trail trace identifier. The TTI includes a source access point identifier and a destination node identifier. In addition, the TTI may further include operator-customized content. STAT: Maintenance signal insertion, used to detect OSUflex_LCK/OSUflex_OCI/OSUflex_AIS. The AIS is an alarm indication signal (AIS), the OCI is an open connection indication (OCI), and the LCK is a locked signal function Locked. TPN: The TPN is used to identify a pipeline and distinguish between pipelines of different services. The TPN can support flexible slot allocation.

FIG. 7 shows an example of a structure of an OSUflex frame. A flexible optical service unit (OSUflex) is a service bearer container of a future optical transport network (OTN). A value of a rate of the flexible optical service unit depends on a rate of a carried service, and the flexible optical service unit may carry a CBR service and a PKT service. It should be noted that the flexible optical service unit may alternatively have another name, such as a flexible optical service data unit (OSDUflex). Any frame that can carry a data signal in both a PON and an OTN may be referred to as a flexible optical service unit frame.

An optical payload unit (OPU) may include OSUflex frames whose quantity is an integer greater than 1. Payload areas of one or more OPU optical payload unit frames are divided into payload blocks whose quantity is an integer. For example, when a size of an OSUflex frame is 16 bytes, one OPU optical payload unit may be divided into 952 payload blocks, and each payload block corresponds to one OSUflex frame. In addition, a plurality of optical payload units OPUs may be combined as one multiframe for payload block division based on a need. When a size of an OSUflex frame is 192 bytes, three OPUs optical payload units are combined into one multiframe for payload block division, the multiframe may be divided into 238 payload blocks, and each payload block corresponds to one OSUflex frame. When a plurality of OSUflex frames are multiplexed to an OPU optical payload unit through mapping, the OSUflex frames are mapped to corresponding payload block locations in the OPU optical payload unit in a one-to-one correspondence.

Figure 8:
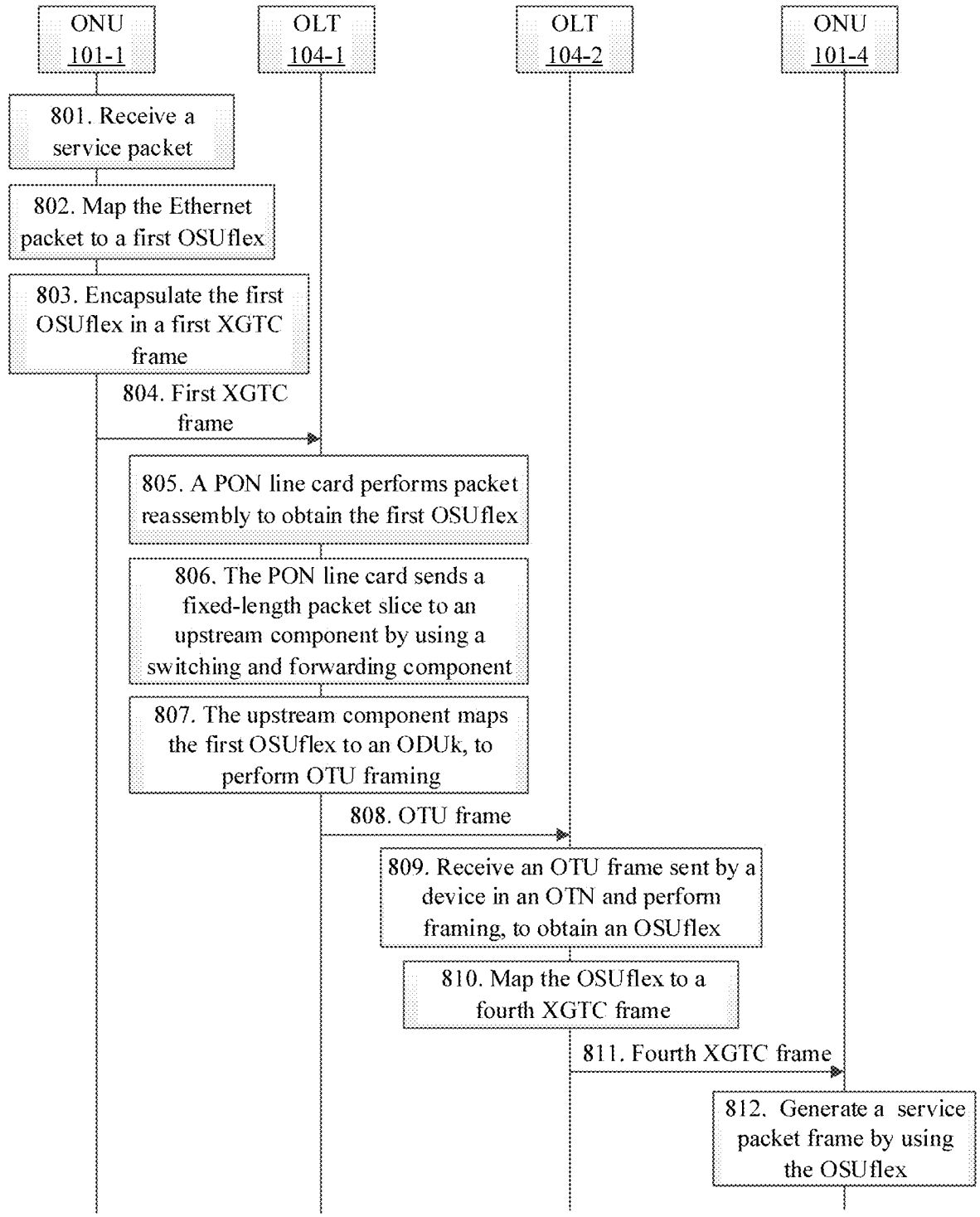
FIG. 8 is a flowchart of an embodiment of a service signal processing method according to an embodiment of this application.

FIG. 8 is a flowchart of an embodiment of a service signal processing method according to this application. With reference to FIG. 3A to FIG. 7, in this embodiment, an ONU 101-1 maps a first service signal to a first OSUflex frame, and an OLT encapsulates the first OSUflex frame to a first OTU frame to be sent to a device in an OTN or a peer ONU 101-4. In addition, the OLT further receives a second OTU frame sent by the device in the OTN, and obtains a second OSUflex frame carried in the second OTU frame and then sends the second OSUflex frame to the ONU using a fourth XGTC frame. The ONU converts the second OSUflex frame in the fourth XGTC frame into a second service signal and provides the second service signal for user equipment. A first OSUflex framing/second service signal obtaining layer f is disposed in the ONU 101-1, and the first OSUflex frame is upstream-transmitted from the ONU 101-1 to the OLT 104-1. In this embodiment of this application, an example in which an OSUflex frame is encapsulated in an XGTC frame is used for description. However, the OSUflex frame may be alternatively encapsulated in a GTC frame. In this embodiment of this application, the GTC frame is not described in detail. As shown in FIG. 8, the method in this embodiment may include the following steps.

S801. The ONU 101-1 receives a service signal sent by user equipment (not shown in the figure).

Referring to FIG. 3A or FIG. 3B, the ONU 101-1 receives, using an interface 4 of a downstream interface module 16, the service signal sent by the user equipment, and processes the received service signal using the downstream interface module 16.

S802. The ONU 101-1 maps the service signal to an OSUflex frame.

A processing module 15 or an OSUflex framing layer in the processing module 15 maps the service signal to the OSUflex frame. For a data structure of the OSUflex frame, refer to FIG. 7 and the related descriptions.

For example, the ONU may determine that a service is a variable bit rate (VBR) service, and the ONU asynchronously maps an Ethernet packet to the OSUflex frame using IDLE adaptation. Alternatively, the ONU may determine that a service is a constant bit rate (CBR) service, and the ONU asynchronously maps the service signal to the OSUflex frame using a generic mapping procedure (GMP). A method for performing asynchronous mapping through IDLE adaptation or performing asynchronous mapping using the GMP may be based on conventional technology. Details are not described herein in this embodiment of this application.

S803. The ONU 101-1 encapsulates the OSUflex frame in a first XGTC frame.

After the processing module 15 obtains the OSUflex frame, an upstream interface module 14 or a first PON MAC layer of the upstream interface module 14 encapsulates the OSUflex frame in the first XGTC frame.

The first XGTC frame carries a service type identifier, used to indicate that the first XGTC frame carries the OSUflex frame. The first XGTC frame may be alternatively in a GTC format. This is not limited herein in this embodiment of this application.

Referring to FIG. 4B and FIG. 6B, the OSUflex frame is encapsulated in a payload of the first XGTC frame, and the first XGTC frame may further include an XGEM payload. That is, the first XGTC frame includes the OSUflex frame and an XGEM frame, and both the OSUflex frame and the XGEM frame have XGEM header fields. An XGEM header field corresponding to the OSUflex frame carries an OSUflex type indication OSU_TI, used to indicate that the XGEM frame carries the OSUflex frame.

Referring to FIG. 4B and FIG. 6B, the OSUflex frame is encapsulated in the XGEM frame, and the XGEM frame in which the OSUflex frame is encapsulated is encapsulated in the payload of the first XGTC frame. The XGEM header field carries the OSUflex type indication OSU_TI, used to indicate that the XGEM frame carries the OSUflex frame.

Referring to FIG. 4C and FIG. 6C, the OSUflex frame is encapsulated in an OTN-class frame, and the OSUflex frame corresponds to an OTN overhead (OH) header field. An OTN frame including the OSUflex frame and the OTN OH header field is encapsulated in the XGTC frame. A header field of the OTN-class frame carries an OSUflex frame type indication.

With reference to the foregoing data structures, before the ONU 101-1 sends the service signal to the OLT 104-1, the ONU 101-1 sends a second XGTC frame to the OLT, where the second XGTC frame carries an OSUflex frame type indication. The OSUflex frame type indication is used to indicate a transmission container (T-CON) instance that is of the ONU and that supports an OSUflex type. The OLT sends, based on the OSUflex type indication, an identifier of the transmission container instance that supports the OSUflex type to the ONU. For example, the OSUflex frame type indication may be carried in an ONU management and control channel (OMCC), and the OLT obtains the OSUflex frame type indication from an ONU management and control interface (OMCI). The OLT sends the identifier of the transmission container instance that supports the OSUflex type to the ONU using a third XGTC frame. The identifier of the transmission container instance that supports the OSUflex type is an allocation identifier in the third XGTC frame. The transmission instance indicated by the identifier of the transmission container instance that supports the OSUflex type is an OSUflex frame transmission instance allocated by the OLT to the ONU.

S804. The ONU 101-1 sends the first XGTC frame to the OLT 104-1.

The upstream interface module 14 or an upstream interface 3 of the upstream interface module 14 sends the first XGTC frame to the OLT 104. For example, a first XGEM frame is sent from the upstream interface 3 of the ONU 101-1 to a downstream interface 2 of the OLT 104-1.

S805. An interface processing module 13 of the OLT 104-1 obtains the OSUflex frame in the first XGTC frame.

The interface processing module 13 of the OLT 104-1 obtains the first OSUflex frame based on the first XGTC frame. For example, the interface processing module 13 may obtain the OSUflex frame based on the OSUflex type indication in the first XGTC frame. The OSUflex type indication may be carried in the header field of the XGEM frame or the header field of the OTN-class frame in the first XGTC frame. A second PON MAC layer d may further determine that the XGTC frame that carries the OSUflex frame is transmitted in the first XGTC frame obtained from the transmission container instance that supports the OSUflex type, and obtain the first OSUflex frame carried in the first XGTC frame.

Corresponding to FIG. 4A to FIG. 4C and FIG. 6A to FIG. 6C, the OLT 104-1 may obtain the OSUflex frame from the XGEM frame in the first XGTC frame, may obtain the OSUflex frame from the first XGTC frame, or may obtain the OSUflex frame from the OTN-class frame in the XGTC frame.

S806. The interface processing module 13 of the OLT 104-1 sends the obtained first OSUflex frame to a first OTU framing/second OSUflex framing layer b of an upstream module using a switching and forwarding module 12.

The second PON MAC layer d in the interface processing module 13 determines, based on the obtained first OSUflex frame, that the first OSUflex frame does not enter a first network processor or traffic management layer for processing, and sends the first OSUflex frame to the switching and forwarding module 12. The switching and forwarding module 12 sends the first OSUflex frame to the upstream module 11.

S807. The first OTU framing/second OSUflex framing layer b of the upstream module 11 of the OLT 104-1 performs OTU framing on the OSUflex frame.

After the upstream module 11 receives the OSUflex frame, the first OTU framing layer of the first OTU framing/second OSUflex framing layer b performs OTU framing on the first OSUflex frame, to generate a first OTU frame.

Referring to FIG. 4A to FIG. 4C, the OSUflex frame is encapsulated in an LO ODU frame of the OTU frame, such as an ODUk frame, an ODUflex frame, or an ODUcn frame.

S808. A first OTU frame sending/second OTU frame receiving layer a of the OLT 104-1 sends the first OTU frame to the device in the OTN or an OLT 104-2.

809. The OLT 104-2 receives a second OTU frame sent by the device in the OTN, and obtains a second OSUflex frame carried in the second OTU frame.

An upstream module 11 of the OLT 104-2 receives the second OTU frame using an upstream interface 1, and the upstream module 11 or a second OSUflex frame layer of the upstream module 11 obtains the second OSUflex frame from the received second OTU frame. The second OTU frame includes the OSUflex frame. The second OSUflex frame layer of a first OTU framing/second OSUflex frame b transmits the second OSUflex frame to a switching and forwarding module 12. The switching and forwarding module 12 switches the received second OSUflex frame to a second PON MAC layer b of an interface processing module 13.

After obtaining the OSUflex frame, the second PON MAC layer b of the interface processing module 13 encapsulates the OSUflex frame in a fourth XGTC frame. A structure of the fourth XGTC frame is the same as the structure of the first XGTC frame. Details are not described herein in this embodiment of this application.

S810. The OLT 104-2 sends the fourth XGTC frame to an ONU 101-4.

The second PON MAC layer g of the interface processing module 13 of the OLT 104-2 allocates a target PON channel based on a bandwidth required by the OSUflex, and deletes a bandwidth occupied by the target PON channel from downstream DBA scheduling of a PON. The second PON MAC layer g of the interface processing module 13 sends the fourth XGTC frame to the ONU 101-4 from a downstream interface 2 of the interface processing module and an upstream interface 3 of the ONU via an ODN through the target PON channel.

S811. The ONU 101-4 converts the second OSUflex frame into a service signal based on the second OSUflex frame in the fourth XGTC frame.

After an upstream interface module 14 in the ONU 101-4 receives the fourth XGTC frame using the upstream interface 3, a first PON MAC layer of the upstream interface module 14 obtains the OSUflex frame through conversion based on the fourth XGTC frame.

After the ONU 101-4 obtains the OSUflex frame, a second service signal layer of a first OSUflex frame/second service signal layer f converts the second OSUflex frame into a second service signal. The ONU 101-4 sends the second service signal to user equipment using a downstream interface 4 of a downstream interface module 16.

According to the service signal processing method provided in this embodiment, the ONU 101-1 maps the received first service signal to the first OSUflex frame, and sends the first OSUflex frame to the OLT 104-1 by encapsulating the first OSUflex frame in the first XGTC frame. After receiving the first XGTC frame, the OLT 104-1 obtains the first OSUflex frame and performs first OTU framing. Therefore, the first OSUflex frame may be directly mapped to the first OTU frame transmitted in the OTN and the first XGTC frame in the PON, such that content transmitted in the PON can be sent to the device in the OTN without protocol conversion. Therefore, a latency caused by protocol conversion can be reduced on a packet transmission path, to implement low-latency transmission. In addition, a protocol conversion operation of the OLT is omitted, to reduce complexity of the OLT, and enhance interworking between the PON and the OTN.

In addition, the OLT 104-2 further receives the second OTU frame that carries the second OSUflex frame, and sends the second OSUflex frame to the ONU 101-4 by adding the second OSUflex frame to the fourth XGTC frame. The ONU 101-4 obtains the second OSUflex frame from the received fourth XGTC frame, and converts the second OSUflex frame into the second service signal and sends the second service signal to the user equipment. Therefore, content transmitted in the OTN can be directly sent to the ONU without protocol conversion, and a latency caused by protocol conversion can be reduced on a packet transmission path, to implement low-latency transmission. In addition, a protocol conversion operation of the OLT is omitted, to reduce complexity of the OLT, and enhance interworking between the PON and the OTN.

FIG. 4A to FIG. 8 are all described using the XGTC frame as an example. However, the flexible optical service unit frame may be alternatively carried in a GTC frame or any passive optical network transmission convergence frame. For a data structure in which the flexible optical service unit frame is carried in the GTC frame, or another passive optical network transmission convergence frame, and processing procedures of an OLT and an ONU, refer to the descriptions in FIG. 4A to FIG. 8. Details are not described herein in this embodiment of this application.

For an operation implemented by each module of the ONU in this embodiment, further refer to the related descriptions in the method embodiment. An implementation principle and a technical effect thereof are similar. Details are not described herein. The module herein may also be replaced with a circuit.

Figure 9:
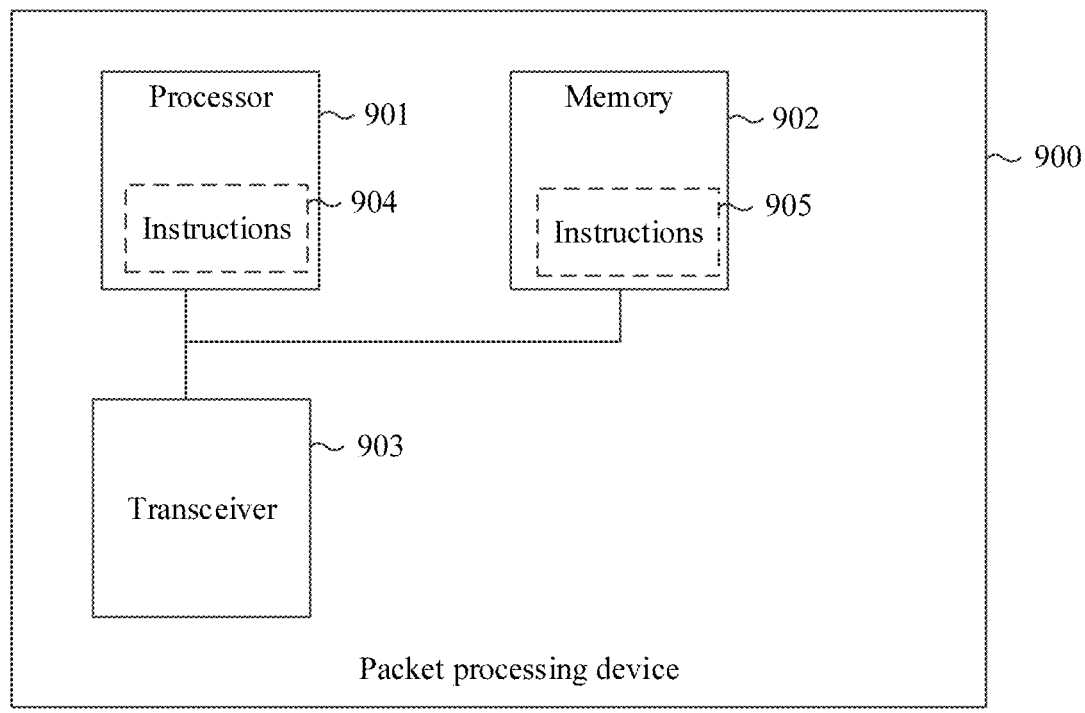
FIG. 9 is a schematic diagram of a structure of a service signal processing device according to this application.

FIG. 9 is a schematic diagram of a structure of a service signal processing device according to this application. The service signal processing device may be an OLT, an ONU, or a device in an OTN. The service signal processing device may be configured to implement a method in a corresponding part described in the foregoing method embodiment. For details, refer to the description in the foregoing method embodiment.

The service signal processing device may include one or more processors 901. The processor 901 may also be referred to as a processing unit, and can implement a specific control function. The processor 901 may be a general purpose processor, a dedicated processor, or the like. For example, the processor 901 may be a baseband processor or a central processing unit. The baseband processor may be configured to process a communication protocol and communication data. The central processing unit may be configured to: control a communication apparatus (for example, a base station, a baseband chip, a DU, or a CU), execute a software program, and process data of the software program.

In a possible design, the processor 901 may also store instructions 904, and the instructions 904 may be run by the processor, to enable the service signal processing device to perform a method that is described in the foregoing method embodiment and that corresponds to a terminal or a network device.

In another possible design, the service signal processing device may include a circuit. The circuit may implement a sending, receiving, or communication function in the foregoing method embodiment.

Optionally, the service signal processing device may include one or more memories 902. The memory 902 stores instructions 905 or intermediate data. The instructions 905 may be run by the processor 901, to enable the service signal processing device to perform the method described in the foregoing method embodiment. Optionally, the memory 902 may further store other related data. Optionally, the processor 901 may also store instructions and/or data. The processor 901 and the memory 902 may be separately disposed, or may be integrated together.

Optionally, the service signal processing device may further include a transceiver 903. The processor 903 may be referred to as a processing unit. The transceiver 903 may be referred to as a transceiver unit, a transceiver machine, a transceiver circuit, a transceiver, or the like, and is configured to implement a transceiver function of the communication apparatus.

This application further provides a readable storage medium. The readable storage medium stores executable instructions. When at least one processor of a service signal processing device executes the executable instructions, the service signal processing device performs the service signal processing method in the foregoing method embodiment.

This application further provides a program product. The program product includes executable instructions, and the executable instructions are stored in a readable storage medium. At least one processor of a service signal processing device may read the executable instructions from the readable storage medium, and the at least one processor executes the executable instructions, to enable the service signal processing device to implement the service signal processing method in the foregoing method embodiment.

Figure 10:
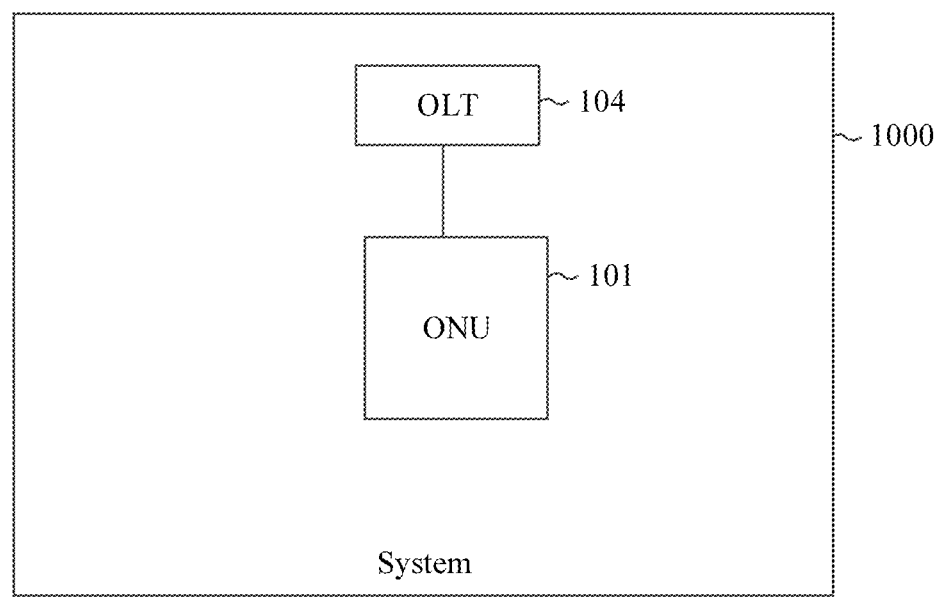
FIG. 10 is a schematic diagram of a structure of a PON system according to this application.

FIG. 10 is a schematic diagram of a structure of a system 1000 according to this application. The system includes the OLT 104 in the foregoing embodiment and the ONU 101 in the foregoing embodiment.

The OLT 104 may perform the foregoing embodiments and any step performed by the OLT 104 in FIG. 8. The ONU 101 may perform the foregoing embodiments and any step performed by the ONU 101 in FIG. 8. Details are not described herein in this embodiment of this application.

The embodiments in this specification are all described in a progressive manner. For same or similar parts in the embodiments, refer to these embodiments. Each embodiment focuses on a difference from other embodiments. For example, a device embodiment is basically similar to a method embodiment, and therefore is described briefly. For related parts, refer to partial descriptions in the method embodiment.

A person of ordinary skill in the art may understand that all or some of the foregoing embodiments may be implemented using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A service signal processing method comprising:
    receiving a service signal;
    mapping the service signal to a flexible optical service unit frame;
    adding the flexible optical service unit frame that maps the service signal in a payload of a first passive optical network (PON) transmission convergence frame, wherein the flexible optical service unit frame is not part of a PON encapsulation frame in the first PON transmission convergence frame; and
    sending the first PON transmission convergence frame to an optical line terminal (OLT),
    wherein the flexible optical service unit frame added in the first PON transmission convergence frame is configured to be received by a device in an optical transmission network (OTN), and
    wherein the flexible optical service unit frame is configured to carry the service signal in a PON and the OTN.

2. The service signal processing method of claim 1, further comprising:
receiving a second service signal;
mapping the second service signal to a second flexible optical service unit frame; and
encapsulating the second flexible optical service unit frame in the first PON transmission convergence frame, wherein the second flexible optical service unit frame is encapsulated in a second payload of a first PON encapsulation frame in the first PON transmission convergence frame, and wherein a header field of the first PON encapsulation frame carries a flexible optical service unit type indication.

3. The service signal processing method of claim 2, wherein the second flexible optical service unit frame comprises a tributary port number (TPN) that is the same as a port identifier (Port-ID) of the first PON encapsulation frame.

4. The service signal processing method of claim 1, wherein before sending the first PON transmission convergence frame, the service signal processing method further comprises sending a second PON transmission convergence frame to the OLT, wherein the second PON transmission convergence frame carries a flexible optical service unit frame type indication, and wherein the flexible optical service unit frame type indication indicates a transmission container instance that is of an optical network unit (ONU) and that supports a flexible optical service unit frame type.

5. The service signal processing method of claim 4, further comprising receiving a third PON transmission convergence frame from the OLT, wherein the third PON transmission convergence frame comprises an identifier of a transmission container (T-CONT) instance that supports a flexible optical service unit frame type, and wherein a transmission container corresponding to the identifier of the T-CONT instance is configured to carry the flexible optical service unit frame.

6. The service signal processing method of claim 1, wherein the flexible optical service unit frame comprises an overhead area and a payload area, wherein the overhead area comprises at least one of: a service frame header indication, a trail trace identifier (TTI), bit interleaved parity-X (BIP-X), a backward error indication (BEI), a backward defect indication (BDI), a status (STAT) indication, a timestamp, a sequence identifier, a mapping overhead, or a tributary port number (TPN), and wherein the payload area is configured to carry the service signal.

7. The service signal processing method of claim 1, wherein the service signal processing method is implemented by an optical network unit coupled to the OLT.

8. A service signal processing method implemented by an optical network device and comprising:
receiving a first passive optical network (PON) transmission convergence frame from an optical network unit (ONU), wherein the first PON transmission convergence frame comprises a first flexible optical service unit frame in a payload of the first PON transmission convergence frame, wherein the first flexible optical service unit frame is not part of a PON encapsulation frame in the first PON transmission convergence frame, wherein the first flexible optical service unit frame is configured to carry a first service signal in a PON and an optical transport network (OTN) and to be received by a device in the OTN, and wherein the first service signal is mapped to the first flexible optical service unit frame; and
sending a first optical transport unit (OTU) frame to a device in the OTN,
wherein the first OTU frame carries the first flexible optical service unit frame.

9. The service signal processing method of claim 8, wherein the first PON transmission convergence frame comprises a first PON encapsulation frame that carries a second flexible optical service unit frame and a second PON encapsulation frame that does not carry the first flexible optical service unit frame, and wherein a header field of the second PON encapsulation frame comprises a flexible optical service unit frame type indication.

10. The service signal processing method of claim 9, wherein the second flexible optical service unit frame comprises an overhead area and a payload area, wherein the overhead area comprises at least one of: a service frame header indication, a trail trace identifier (TTI), bit interleaved parity-X (BIP-X), a backward error indication (BEI), a backward defect indication (BDI), a status (STAT) indication, a timestamp, a sequence identifier, a mapping overhead, or a tributary port number (TPN), wherein the payload area is configured to carry the first service signal, and wherein the TPN is the same as a port identifier (Port-ID) of the first PON encapsulation frame.

11. The service signal processing method of claim 8, further comprising obtaining the first flexible optical service unit frame from an optical transport network (OTN) -class frame in the first PON transmission convergence frame, wherein a header field of the OTN -class frame comprises a flexible optical service unit frame type indication.

12. The service signal processing method of claim 8, wherein before receiving the first PON transmission convergence frame, the service signal processing method further comprises:
receiving a second PON transmission convergence frame from the ONU, wherein the second PON transmission convergence frame carries a flexible optical service unit frame type indication;
obtaining, based on the flexible optical service unit frame type indication, an identifier of a transmission container instance that supports a flexible optical service unit frame type; and
sending a third PON transmission convergence frame to the ONU, wherein the third PON transmission convergence frame comprises the identifier of the transmission container instance that supports the flexible optical service unit frame type.

13. The service signal processing method of claim 12, further comprising:
receiving a second OTU frame from the device in the OTN, wherein the second OTU frame comprises a second flexible optical service unit frame;
encapsulating the second flexible optical service unit frame in a fourth PON transmission convergence frame; and
sending the fourth PON transmission convergence frame to the ONU.

14. A service signal processing method comprising:
receiving a passive optical network (PON) transmission convergence frame from an optical line terminal (OLT), wherein the PON transmission convergence frame comprises a flexible optical service unit frame a payload of the PON transmission convergence frame, wherein the flexible optical service unit frame is not part of a PON encapsulation frame in the PON transmission convergence frame, wherein the flexible optical service unit frame is configured to carry a service signal in a PON and an optical transport network (OTN) and to be received by a device in the OTN, and wherein the service signal is mapped to the flexible optical service unit frame;

obtaining the service signal from the flexible optical service unit frame; and sending the service signal.

15. The service signal processing method of claim 14, wherein the PON transmission convergence frame comprises a first PON encapsulation frame that carries a second flexible optical service unit frame and a second PON encapsulation frame that does not carry the flexible optical service unit frame, and wherein the first PON encapsulation frame further comprises a flexible optical service unit frame type indication.

16. An optical network unit (ONU), comprising:
a downstream interface configured to receive a service signal;
a processor configured to:
map the service signal to a flexible optical service unit frame;
add the flexible optical service unit frame that maps the service signal in a payload of a first passive optical network (PON) transmission convergence frame, wherein the flexible optical service unit frame is not part of a PON encapsulation frame in the first PON transmission convergence frame; and
an upstream interface configured to send the PON transmission convergence frame to an optical line terminal (OLT),
wherein the flexible optical service unit frame added in the first PON transmission convergence frame is configured to be received by a device in an optical transmission network (OTN), and
wherein the flexible optical service unit frame is configured to carry the service signal in a PON and the OTN.

17. The ONU of claim 16, wherein before the upstream interface sends the first PON transmission convergence frame to the OLT, the upstream interface sends a second PON transmission convergence frame to the OLT, wherein the second PON transmission convergence frame carries a flexible optical service unit frame type indication, and wherein the flexible optical service unit frame type indication indicates a transmission container instance that is of the ONU and that supports a flexible optical service unit frame type.

18. The ONU of claim 17, wherein the upstream interface is further configured to receive a third PON transmission convergence frame from the OLT, wherein the third PON transmission convergence frame comprises an identifier of a transmission container (T-CONT) instance that supports a flexible optical service unit frame type, and wherein a transmission container corresponding to the identifier of the T-CONT instance is configured to carry the flexible optical service unit frame.

19. The ONU of claim 16, wherein the flexible optical service unit frame comprises an overhead area and a payload area, wherein the overhead area comprises at least one of: a service frame header indication, a trail trace identifier (TTI), bit interleaved parity-X (BIP-X), a backward error indication (BEI), a backward defect indication (BDI), a status (STAT) indication, a timestamp, a sequence identifier, a mapping overhead, or a tributary port number (TPN), and wherein the payload area is configured to carry the service signal.

20. The ONU of claim 16, wherein the processor is further configured to:
receive a second service signal;
map the second service signal to a second flexible optical service unit frame; and
encapsulate the second flexible optical service unit frame in the first PON transmission convergence frame, wherein the second flexible optical service unit frame is encapsulated in a second payload of a first PON encapsulation frame in the first PON transmission convergence frame, and wherein a header field of the first PON encapsulation frame carries a flexible optical service unit type indication.

21. An optical line terminal (OLT), comprising:
a processor configured to receive a first passive optical network (PON) transmission convergence frame from an optical network unit (ONU), wherein the first PON transmission convergence frame comprises a first flexible optical service unit frame in a payload of the first PON transmission convergence frame, wherein the first flexible optical service unit frame is not part of a PON encapsulation frame in the first PON transmission convergence frame, wherein the first flexible optical service unit frame is configured to carry a first service signal in a PON and an optical transport network (OTN) and to be received by a device in the OTN, and wherein the first service signal is mapped to the first flexible optical service unit frame; and
an interface configured to send a first optical transport unit (OTU) frame to a device in the OTN,
wherein the first OTU frame carries the first flexible optical service unit frame.

22. The OLT of claim 21, wherein the first PON transmission convergence frame comprises a first PON encapsulation frame that carries a second flexible optical service unit frame and a second PON encapsulation frame that does not carry the first flexible optical service unit frame, and wherein a header field of the first PON encapsulation frame further comprises a flexible optical service unit frame type indication.

23. The OLT of claim 21, wherein the processor is further configured to obtain the first flexible optical service unit frame from an optical transport network (OTN)-class frame in the first PON transmission convergence frame, and wherein a header field of the OTN-class frame comprises a flexible optical service unit frame type indication.

24. The OLT of claim 21, wherein the processor is further configured to:
receive a second PON transmission convergence frame from the ONU, wherein the second PON transmission convergence frame carries a flexible optical service unit frame type indication;
obtain, based on the flexible optical service unit frame type indication, an identifier of a transmission container instance that supports a flexible optical service unit frame type; and
send a third PON transmission convergence frame to the ONU, wherein the third PON transmission convergence frame comprises the identifier of the transmission container instance that supports the flexible optical service unit frame type.

25. The OLT of claim 24, wherein the processor is further configured to:
receive a second OTU frame from the device in the OTN, wherein the second OTU frame comprises a second flexible optical service unit frame, and wherein a second service signal is encapsulated in the second flexible optical service unit frame;

encapsulate the second flexible optical service unit frame in a fourth PON transmission convergence frame; and send the fourth PON transmission convergence frame to the ONU.

26. An optical network unit (ONU), comprising:
a downstream interface configured to receive a passive optical network (PON) transmission convergence frame from an optical line terminal (OLT), wherein the PON transmission convergence frame comprises a flexible optical service unit frame in a payload of the PON transmission convergence frame, wherein the flexible optical service unit frame is not part of a PON encapsulation frame in the PON transmission convergence frame, wherein the flexible optical service unit frame is configured to carry a service signal in a PON and an optical transport network (OTN) and to be received by a device in the OTN, and wherein the service signal is mapped to the flexible optical service unit frame;
a processor configured to obtain the service signal from the flexible optical service unit frame; and
a downstream interface module configured to send the service signal.

27. The ONU of claim 26, wherein the PON transmission convergence frame comprises a first PON encapsulation frame that carries the flexible optical service unit frame and a second PON encapsulation frame that does not carry the flexible optical service unit frame, and wherein a header field of the first PON encapsulation frame comprises a flexible optical service unit frame type indication.

* * * * *